United States Patent
Yang

(10) Patent No.: US 12,153,784 B2
(45) Date of Patent: Nov. 26, 2024

(54) OBJECT POSITION ADJUSTMENT METHOD AND ELECTRONIC DEVICE

(71) Applicant: VIVO MOBILE COMMUNICATION CO., LTD., Guangdong (CN)

(72) Inventor: Qihao Yang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 2 days.

(21) Appl. No.: 17/673,671

(22) Filed: Feb. 16, 2022

(65) Prior Publication Data

US 2022/0171522 A1 Jun. 2, 2022

Related U.S. Application Data

(63) Continuation of application No. PCT/CN2020/106795, filed on Aug. 4, 2020.

(30) Foreign Application Priority Data

Aug. 16, 2019 (CN) .......................... 201910757105.4

(51) Int. Cl.
*G06F 3/04845* (2022.01)
*G06F 3/04883* (2022.01)

(52) U.S. Cl.
CPC ...... *G06F 3/04845* (2013.01); *G06F 3/04883* (2013.01)

(58) Field of Classification Search
CPC ............... G06F 3/04845; G06F 3/0484; G06F 3/04883; G06F 3/0488; G06F 3/0487
USPC ........................................................ 715/764
See application file for complete search history.

(56) References Cited

U.S. PATENT DOCUMENTS

| 8,619,038 B2 * | 12/2013 | Chaudhri ............... G06F 3/0486 345/173 |
| 9,229,624 B2 * | 1/2016 | Wei ...................... G06F 3/04842 |
| 9,606,665 B2 * | 3/2017 | Choi ...................... G06F 3/0416 |
| 10,056,006 B1 * | 8/2018 | Hsu-Hoffman ........ G09B 9/052 |
| 2009/0058821 A1 | 3/2009 | Chaudhri et al. |
| 2011/0175816 A1 * | 7/2011 | Shin ...................... G06F 3/04883 345/168 |

(Continued)

FOREIGN PATENT DOCUMENTS

| CN | 202110524 U | * | 1/2012 |
| CN | 202133989 U | * | 2/2012 |

(Continued)

OTHER PUBLICATIONS

IN Examination Report dated Aug. 23, 2022 as received in Application No. 202227014159.

(Continued)

*Primary Examiner* — Hwei-Min Lu
(74) *Attorney, Agent, or Firm* — BROOKS KUSHMAN P.C.

(57) ABSTRACT

An object position adjustment method and an electronic device are provided. The object position adjustment method includes: receiving a first input performed by a user, marking a first object by using a first mark in response to the first input; receiving a second input performed by the user; and switching positions of the first object and a second object in response to the second input, where the second object is marked by using a second mark.

18 Claims, 16 Drawing Sheets

(56) References Cited

U.S. PATENT DOCUMENTS

| | | | |
|---|---|---|---|
| 2012/0182296 A1* | 7/2012 | Han | G06F 3/04883 |
| | | | 715/810 |
| 2012/0188191 A1* | 7/2012 | Chen | G06F 3/04883 |
| | | | 345/173 |
| 2013/0120464 A1 | 5/2013 | Wei et al. | |
| 2014/0160049 A1* | 6/2014 | Shin | G06F 9/543 |
| | | | 345/173 |
| 2014/0320418 A1* | 10/2014 | Tseng | G06F 3/04883 |
| | | | 345/173 |
| 2015/0007069 A1* | 1/2015 | Huang | G06F 3/04817 |
| | | | 715/763 |
| 2015/0123921 A1 | 5/2015 | Choi et al. | |
| 2015/0355802 A1* | 12/2015 | Shiomi | G06F 3/0484 |
| | | | 715/771 |
| 2015/0378502 A1* | 12/2015 | Hu | G06F 3/04845 |
| | | | 345/173 |
| 2016/0154572 A1 | 6/2016 | Ogawa | |
| 2017/0010766 A1* | 1/2017 | Nakashima | B60K 35/00 |
| 2017/0097764 A1 | 4/2017 | Takahashi | |
| 2017/0131878 A1* | 5/2017 | Tan | G06F 3/04883 |
| 2020/0372142 A1 | 11/2020 | Huang et al. | |

FOREIGN PATENT DOCUMENTS

| | | | | | |
|---|---|---|---|---|---|
| CN | 103019547 | A | | 4/2013 | |
| CN | 104731501 | A | * | 6/2015 | |
| CN | 105094527 | A | * | 11/2015 | |
| CN | 105446598 | A | * | 3/2016 | |
| CN | 107656677 | A | * | 2/2018 | ......... G06F 3/04817 |
| CN | 107870705 | A | * | 4/2018 | ......... G06F 3/04817 |
| CN | 107967086 | A | | 4/2018 | |
| CN | 109814772 | A | * | 5/2019 | |
| CN | 109885222 | A | * | 6/2019 | |
| CN | 110536006 | A | | 12/2019 | |
| JP | 5114181 | B2 | | 1/2013 | |
| JP | 2015-197887 | A | | 11/2015 | |
| JP | 2016-105223 | A | | 6/2016 | |
| JP | 2017-072944 | A | | 4/2017 | |
| WO | 2015/131630 | A1 | | 9/2015 | |
| WO | WO-2018032694 | A1 | * | 2/2018 | ......... G06F 3/0486 |
| WO | 2018/209578 | A1 | | 11/2018 | |

OTHER PUBLICATIONS

Extended European Search Report dated Sep. 20, 2022 as received in Application No. 20853703.5.
CN Office Action dated Sep. 2, 2020 as received in Application No. 201910757105.4.
Written Opinion of the International Searching Authority dated Oct. 30, 2020 as received in Application No. PCT/CN2020/106795.
JP Office Action dated Mar. 7, 2023 as received in Application No. 2022-510182.

* cited by examiner

OBJECT POSITION ADJUSTMENT METHOD AND ELECTRONIC DEVICE

CROSS-REFERENCE TO RELATED APPLICATIONS

This application is continuation application of PCT International Application No. PCT/CN2020/106795 filed on Aug. 4, 2020, which claims priority to Chinese Patent Application No. 201910757105.4, filed on Aug. 16, 2019 in China, the disclosures of which are incorporated herein by reference in their entireties.

TECHNICAL FIELD

Embodiments of the present disclosure relate to the field of communications technologies, and in particular, to an object position adjustment method and an electronic device.

BACKGROUND

Currently, there are more and more applications of a mobile phone. In an icon management manner in the related art, it is difficult for a user to manage a plurality of icons at the same time, and in particular, it is difficult to sort icons across desktops. When icons of a plurality of desktop are exchanged, operations are cumbersome and time-consuming.

SUMMARY

According to a first aspect, the embodiments of the present disclosure provide an object position adjustment method, including:
  receiving a first input performed by a user;
  marking a first object by using a first mark in response to the first input;
  receiving a second input performed by the user; and
  switching positions of the first object and a second object in response to the second input, where
  the second object is marked by using a second mark.

According to a second aspect, the embodiments of the present disclosure further provide an electronic device, including:
  a first receiving module, configured to receive a first input performed by a user;
  a marking module, configured to mark a first object by using a first mark in response to the first input;
  a second receiving module, configured to receive a second input performed by the user; and
  a switching module, configured to switch positions of the first object and a second object in response to the second input.

According to a third aspect, the embodiments of the present disclosure further provide an electronic device, including a processor, a memory, and a computer program that is stored in the memory and that can be run by the processor, where when the computer program is executed by the processor, the steps of the foregoing object position adjustment method are implemented.

According to a fourth aspect, the embodiments of the present disclosure further provide an electronic device, including:
  a touchscreen, where the touchscreen includes a touch-sensitive surface and a display screen;
  one or more processors;
  one or more memories;
  one or more sensors; and
  one or more computer programs, where the one or more computer programs are stored in the one or more memories, the one or more computer programs include an instruction, and when the instruction is executed by the electronic device, the electronic device performs the steps of the foregoing object position adjustment method.

According to a fifth aspect, the embodiments of the present disclosure further provide a computer-readable storage medium, where the computer-readable storage medium stores a computer program, and when the computer program is executed by a processor, the steps of the foregoing object position adjustment method are implemented.

According to a sixth aspect, the embodiments of the present disclosure further provide a computer non-transitory storage medium. The computer non-transitory storage medium stores a computer program, and when the computer program is executed by a computing device, the steps of the foregoing object position adjustment method are implemented.

According to a seventh aspect, the embodiments of the present disclosure further provide a computer program product. When running on a computer, the computer program product enables the computer to perform the steps of the foregoing object position adjustment method.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

Figure 1:
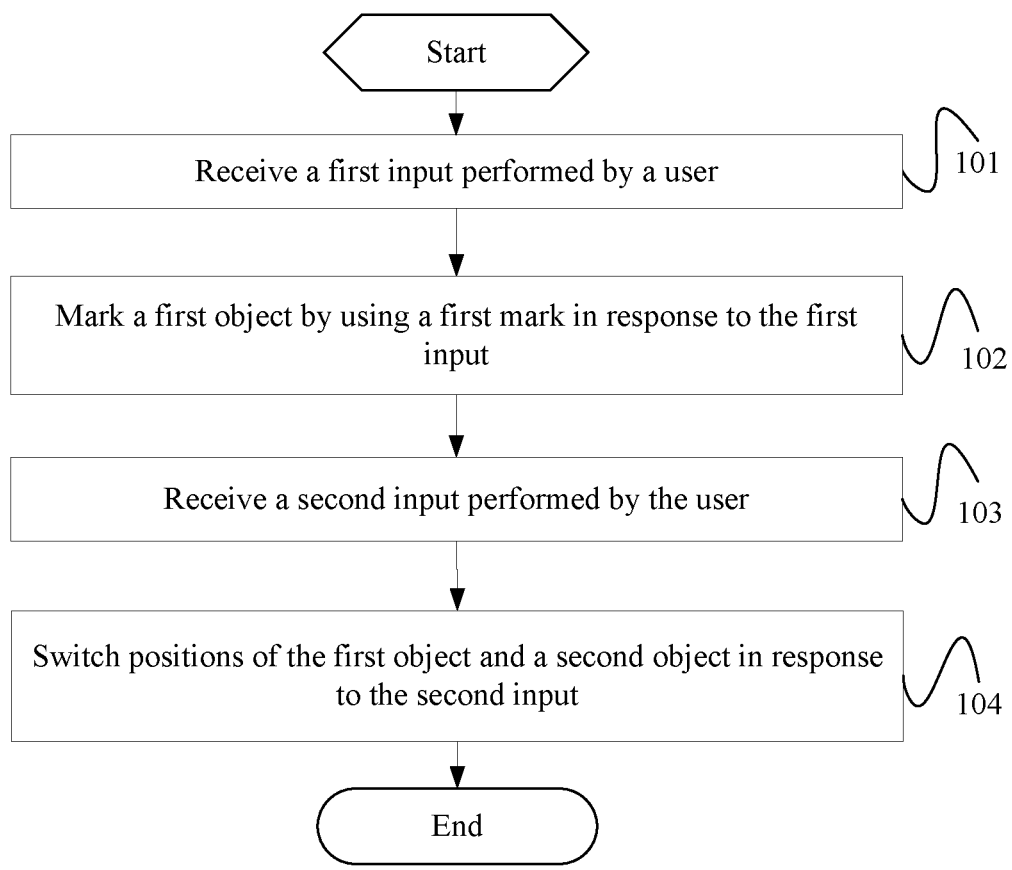
FIG. 1 is a schematic flowchart of an object position adjustment method according to an embodiment of the present disclosure.

As shown in FIG. 1, an embodiment of the present disclosure provides an object position adjustment method, including:

Step 101: Receive a first input performed by a user.

It should be noted that the first input may be a tap input, a long press and hold input, a slide input, or the like, that is, the first input is an input or an operation that is performed by the user on an interface of an electronic device to mark a first object, including a tap operation, a long press and hold operation, a slide operation, a zoom operation, or the like.

Step 102: Mark a first object by using a first mark in response to the first input.

Specifically, the electronic device needs to mark the first object, to distinguish a to-be-moved object from an object that does not need to be moved. In addition, to conveniently distinguish objects during moving, a mark number of each object (that is, specific content of the first mark) needs to be determined, and the mark number is distinguished by using different numbers, for example, mark numbers are allocated to the first object in ascending order of numbers.

Step 103: Receive a second input performed by the user.

It should be noted that the second input may be a tap input, a long press and hold input, a slide input, or the like, that is, the second input is an operation that is performed by the user on the interface of the electronic device to switch positions of the first object and a second object, including a tap operation, a long press and hold operation, a slide operation, a zoom operation, or the like.

Step 104: Switch positions of the first object and a second object in response to the second input.

The second object is marked by using a second mark.

It should be noted that, in the foregoing manner, positions of different objects on the interface of the electronic device may be switched. The object may be an application icon of an application program, may be an icon of a folder, or may be an image displayed on the interface of the electronic device.

It should be noted that in this embodiment of the present disclosure, cross-desktop movement of application icons is mainly implemented. During cross-desktop movement, only a predetermined operation (which may be a slide operation, a tap operation, or a press and hold operation) needs to be performed on a second screen desktop, so that a specific application icon that is in marked application icons on a first screen desktop and that is corresponding to the predetermined operation can be moved to the second screen desktop. Therefore, the user does not need to perform an operation of dragging an application icon from one screen desktop to another screen desktop, thereby reducing operation complexity of the user.

Figure 2:
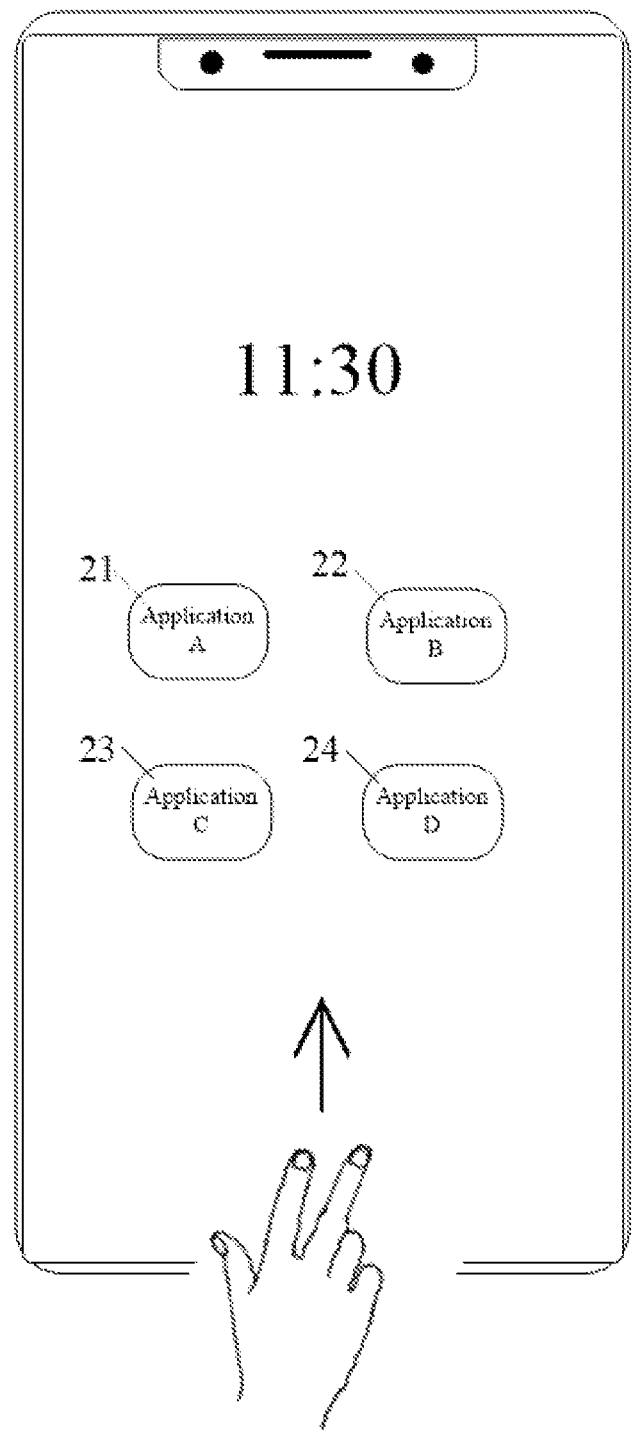
FIG. 2 is a schematic diagram of a user operation status of entering a mode of adjusting a position of an application icon.

The following examples are described by using an example in which a position of an application icon is adjusted. It should be noted that, in this embodiment of the present disclosure, a position of an application icon may be directly adjusted in a normal mode of a terminal (the normal mode means that the user may open an application on a desktop). Further, it should be noted that in this case, the operation used in this embodiment of the present disclosure should be different from an operation in the related art to avoid a false trigger. Optionally, before this embodiment of this disclosure, the electronic device may also first enter a mode of adjusting the position of the application icon (in this mode, only the position of the application icon can be adjusted, which is different from the foregoing normal mode). For example, the user may perform a slide operation on the desktop to enter the mode of adjusting the position of the application icon. As shown in FIG. 2, the user slides upward from the bottom of the screen by using three fingers (an arrow direction in FIG. 2 indicates a slide direction of the finger), that is, may enter the mode of adjusting the position of the application icon. In FIG. 2, application icons from the top to the bottom and from the left to the right are an icon 21 corresponding to an application A, an icon 22 corresponding to an application B, an icon 23 corresponding to an application C, and an icon 24 corresponding to an application D.

It should be noted that, when the user marks the first object, a quantity of marked first objects is different because the first input is performed differently. The following separately describes step 102 in this embodiment of the present disclosure in detail from different perspectives.

In a first manner, there are N first objects, N is an integer greater than or equal to 1, the first input includes N first sub-inputs, and each first sub-input acts on one first object.

It should be noted that, in this case, a specific implementation of step 102 is:

obtaining a first input feature of an $i^{th}$ first sub-input;

determining an $i^{th}$ first mark of an $i^{th}$ first object based on the first input feature; and marking the $i^{th}$ first object by using the $i^{th}$ first mark, where i is a positive integer, and i≤N.

It should be noted that in this case, the user performs the first sub-input once to mark only one first object.

Further, it should be noted that, for different first input features, a manner of determining the $i^{th}$ first mark of the $i^{th}$ first object is also different. When the first input feature is an input sequence and fingerprint information that are of the $i^{th}$ first sub-input, the manner of determining the $i^{th}$ first mark of the $i^{th}$ first object specifically is:

in a case that the fingerprint information of the $i^{th}$ first sub-input is preset first fingerprint information, determining the $i^{th}$ first mark of the $i^{th}$ first object based on the input sequence of the $i^{th}$ first sub-input.

It should be noted that, because different fingers correspond to different fingerprint information, a specific finger may be used in advance to mark the first object in this case. For example, an index finger is used to mark the first object. When the index finger operates one application icon once, the application icon is marked as 1. When the index finger operates another application icon once, the application icon is marked as 2. By analogy, to clearly let the user know a specific mark of each application icon, a corresponding mark number is displayed below each application icon.

When the first input feature is fingerprint information of the $i^{th}$ first sub-input, and fingerprint information of each first sub-input is different, the manner of determining the $i^{th}$ first mark of the $i^{th}$ first object is specifically:

determining a mark associated with the fingerprint information of the $i^{th}$ first sub-input as the $i^{th}$ first mark of the $i^{th}$ first object.

It should be noted that in this case, a plurality of pieces of different fingerprint information are preset, different fingerprint information corresponds to different first identifiers, and an object is marked by using different fingerprint information. For example, a mark corresponding to fingerprint information of an index finger is 1, and a mark corresponding to fingerprint information of a middle finger is 2. When the user marks an application icon by using the middle finger, and the terminal obtains the mark 2 corresponding to the fingerprint information of the middle finger, the terminal marks the application icon as 2. To clearly let the user know a sequence of marks, a corresponding mark number is displayed below each application icon.

It should be further noted that, to facilitate identifying the first object marked by the user, a marking box needs to be displayed on the first object. The marking box is a preset shape. The preset shape may be a regular shape such as a circle, a square, a diamond, or a triangle, or may be an irregular shape defined by the user. The marking box is used to clearly indicate the first object marked by the user, so that the user can distinguish the marked first object.

Figure 3:
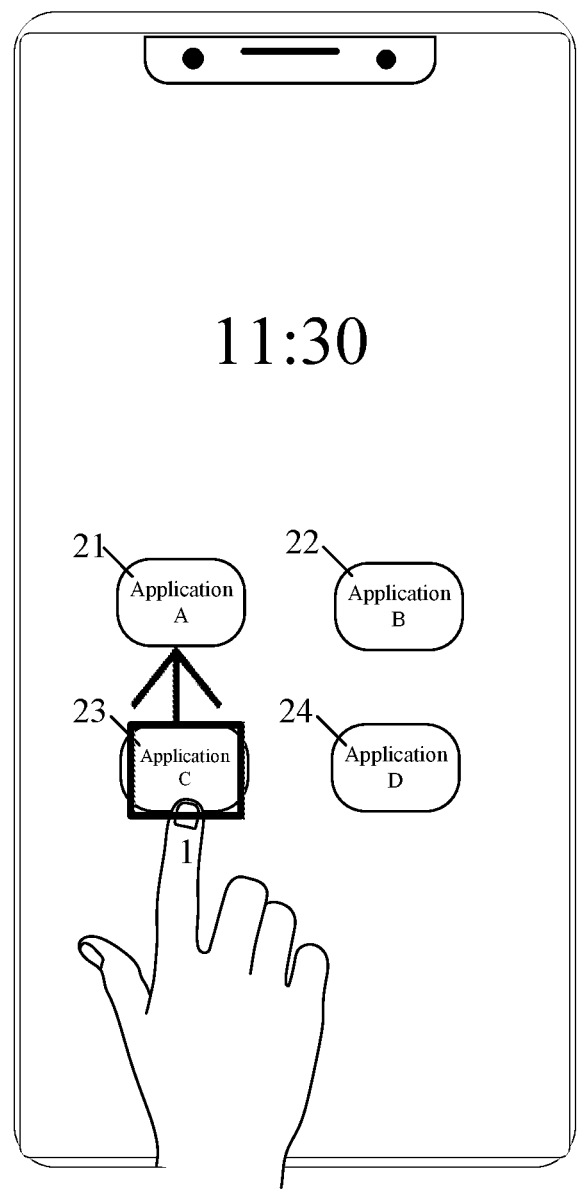
FIG. 3 is a first schematic diagram of a user operation status of marking an application icon.

For example, as shown in FIG. 3, if the user wants to mark an icon 23 corresponding to an application C, the user needs to press and hold the icon 23 corresponding to the application C and slide the icon 23 in an arrow direction in FIG. 3 to display a square marking box above the icon 23 corresponding to the application C. If the user wants to mark an icon 22 corresponding to an application B, the user needs to press and hold the icon 22 corresponding to the application B and slide the icon 22 in an arrow direction in FIG. 3 to display a square marking box above the icon 22 corresponding to the application B.

It should be noted that, in this case, the user directly performs different marking by using a plurality of objects, so that a plurality of pairs of objects are quickly switched, thereby reducing operation time and improving user experience.

In a second manner, there are M first objects, and M is an integer greater than or equal to 1.

It should be noted that, in this case, a specific implementation of step 102 is:

obtaining a second input feature of the first input; and
marking the M first objects by using M first marks based on the second input feature.

It should be noted that in this case, the user may perform the first input once to mark at least one object at the same time. Specifically, a quantity of objects that can be marked may be preset by the user and stored in the electronic device.

Further, it should be noted that the first input is a touch input performed by the user in a target area on a target interface, the target area does not include the first object or the second object, and the second input feature includes M touch points. Specifically, an implementation of marking the M first objects by using the M first marks based on the second input feature is:

sequentially marking the M first objects from a preset object on the target interface, where
the preset object includes an object of a preset type or an object at a preset position.

In a case that the preset object is the object of the preset type, the M first objects are objects of a same type. That is, in this case, the electronic device marks the objects of the same type. For example, if a type of the first object is online shopping, the electronic device sequentially marks M application icons whose types are online shopping from a first application icon whose type is a network on the target interface.

In a case that the preset object is the object at the preset position, the M first objects are objects at adjacent arrangement positions or objects at preset arrangement intervals. That is, in this case, the electronic device marks adjacent first objects or first objects arranged into a preset rule (for example, marks one application icon every other application icon). For example, the user performs the first input by using M fingers, and the electronic device marks M application icons from a first application icon on the target interface, or starting from a first application icon on the target interface, the electronic device marks one application icon every two application icons until the M application icons are marked.

In this case, the electronic device determines, based on an arrangement sequence of first objects on a desktop, that mark numbers of marked first object corresponds to the arrangement sequence, that is, sequentially numbers the marked first objects from front to back based on the arrangement sequence from front to back. Specifically, to facilitate the user to view the mark numbers, the mark number corresponding to the first object is displayed on one side of each marked first object. The mark numbers are distinguished by using different numbers. For example, a mark number of a first object ranked first is 1, a mark number of a first object ranked second is 2, and by analogy.

Figure 4:
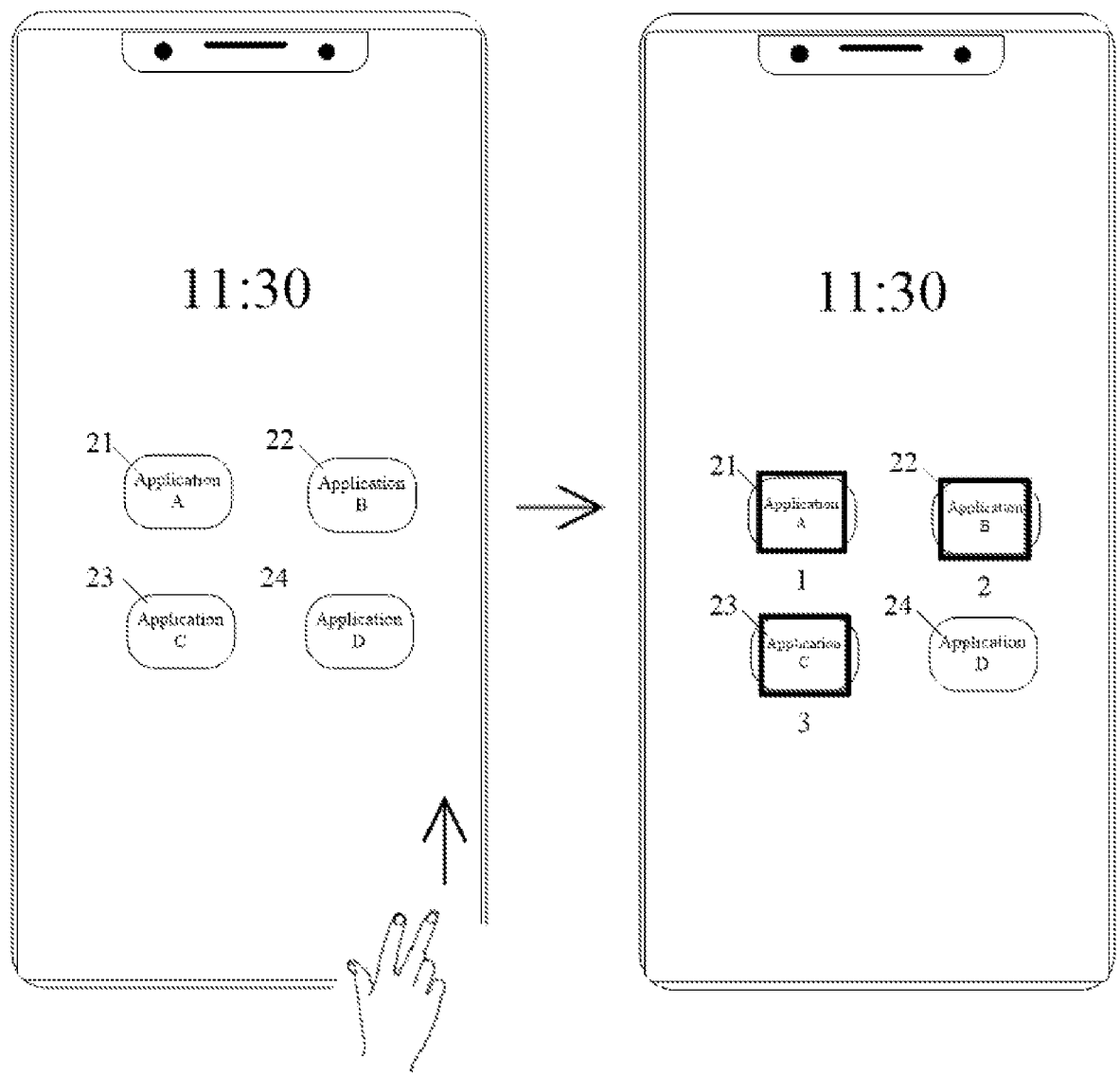
FIG. 4 is a second schematic diagram of a user operation status of marking an application icon.

For example, as shown in FIG. 4, if the user wants to mark three application icons, the user may use three fingers to slide upward in an arrow direction on an interface, and the electronic device marks the first three application icons on the desktop. After the user performs the first input, mark numbers of marked application icons on the desktop of the electronic device are 1, 2, and 3, and corresponding application icons are an icon 21 corresponding to an application A, an icon 22 corresponding to an application B, and an icon 23 corresponding to an application C.

It should be noted that, in this case, an operation manner of simultaneously marking a plurality of objects avoids individual marking of an object, reduces interaction time, and meets a requirement for using the electronic device by the user in more scenarios.

It should be further noted that, after the user marks the first object, a case that mark numbers of some first objects may not meet an adjustment requirement during subsequent object adjustment. Therefore, after the first object is marked, the user may further exchange marks of different objects. A specific implementation is: receiving a third input performed by the user on a first target object and a second target object in the N first objects; and exchanging a first identifier of the first target object and a first identifier of the second target object in the first objects in response to the third input.

It should be noted that the third input may be a tap input, a long press and hold input, a slide input, or the like. Specifically, an optional implementation of receiving the third input performed by the user on the first target object and the second target object in the N first objects is:

receiving the third input through which the user moves the first target object to a position that at least partially overlaps the second target object.

Figure 5:
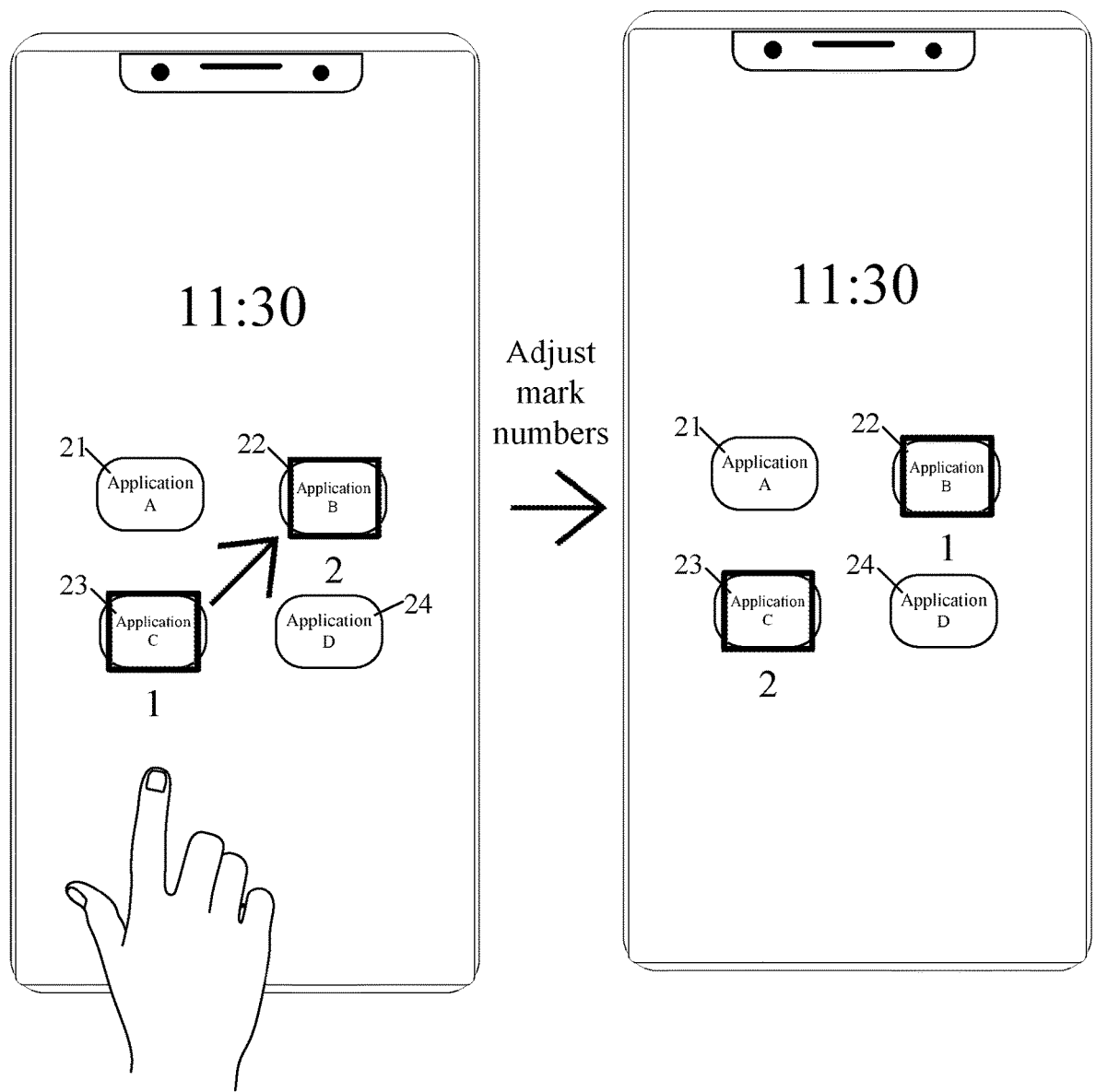
FIG. 5 is a schematic diagram of a user operation status of adjusting a mark number of an application icon.

For example, when the user presses and holds an application icon corresponding to a to-be-modified mark number on one desktop to slide to another marked application icon on the same desktop, mark numbers of the two application icons are exchanged, thereby modifying a mark number of an application icon. For example, as shown in FIG. 5, a left part in FIG. 5 is a state before a mark number of an application icon is adjusted. In this case, a mark number of an icon 23 corresponding to an application C is 1, and a mark number of an icon 22 corresponding to an application B is 2. The user slides the icon 23 corresponding to the application C to the icon 22 corresponding to the application B in an arrow direction the figure. In this case, a mark number of the icon 23 corresponding to the application C and a mark number of the icon 22 corresponding to the application B are changed, and a status of a desktop after the mark number is adjusted is shown in a right part in FIG. 5. In this case, the mark number of the icon 23 corresponding to the application C is 2, and the mark number of the icon 22 corresponding to the application B is 1.

It should be noted that, the third input is used to exchange mark numbers of different objects, so that the user can flexibly switch objects.

The following describes a specific implementation of step 104.

In a first manner, objects are directly switched.

Specifically, in this case, a specific implementation of step 104 is:

obtaining a third input feature of the second input; and
    marking the second object by using the second mark based on the third input feature, and switching the positions of the first object and the second object in a case that the second mark matches the first mark.

It should be noted that, in this case, the marking of the second object and the switching of the positions of the objects are performed simultaneously, and an object switching process may be implemented quickly. Specifically, an implementation of marking the second object by using the second marking is similar to the implementation of marking the first object by using the first mark, and is not described herein again.

The electronic device performs switching through identifier matching. For example, when the first mark is 1, the electronic device switches positions of objects whose first mark is 1 and second mark is 1.

For example, on a first screen desktop, the user marks an icon A by using a middle finger, marks an icon B by using an index finger, and marks an icon C by using a thumb, and mark numbers corresponding to the middle finger, the index finger, and the thumb are 1, 2, and 3. When the user performs a slide operation on a second screen desktop by pressing and holding an icon E by using an index finger, a position of the icon E and a position of the icon B on the first screen desktop are switched. After the switching, the icon E is displayed at the position of the icon B, and the icon B is displayed at the position of the icon E.

In a second manner, the second object is marked first, and then objects are switched through an input performed by the user.

Specifically, in this case, a specific implementation of step 104 is:

obtaining a fourth input feature of the second input;
    marking the second object by using the second mark based on the fourth input feature;
    receiving a fourth input performed by the user; and
    switching the positions of the first object and the second object in response to the fourth input in a case that a first identifier matches a second identifier.

It should be noted that the implementation of marking the second object by using the second mark is similar to the manner of marking the first object by using the first mark. Details are as follows:

In a first manner, there are H second objects, H is an integer greater than or equal to 1, the second input includes H second sub-inputs, and each second sub-input acts on one second object.

It should be noted that in this case, the specific implementation of marking the second object by using the second mark is:

obtaining a fourth input feature of a $j^{th}$ second sub-input; determining a $j^{th}$ second mark of a $j^{th}$ second object based on the fourth input feature; and marking the $j^{th}$ second object by using the $j^{th}$ second mark, where j is a positive integer, and j≤H.

It should be noted that in this case, the user performs the second sub-input once to mark only one second object.

Further, it should be noted that, for different fourth input features, a manner of determining the $j^{th}$ second mark of the $j^{th}$ second object is also different. When the fourth input feature is an input sequence and fingerprint information that are of the $j^{th}$ second sub-input, a manner of determining the $j^{th}$ second mark of the $j^{th}$ second object is specifically:

in a case that the fingerprint information of the $j^{th}$ second sub-input is preset second fingerprint information, determine the $j^{th}$ second mark of the $j^{th}$ second object based on the input sequence of the $j^{th}$ second sub-input.

It should be noted that, because different fingers correspond to different fingerprint information, a specific finger may be used in advance to mark the second object in this case. For example, an index finger is used to mark the second object. When the index finger operates one application icon once, the application icon is marked as 1. When the index finger operates another application icon once, the application icon is marked as 2. By analogy, to clearly let the user know a specific mark of each application icon, a corresponding mark number is displayed below each application icon.

When the fourth input feature is fingerprint information of the $j^{th}$ second sub-input, and fingerprint information of each second sub-input is different, the manner of determining the $j^{th}$ second mark of the $j^{th}$ second object is specifically:

determining a mark associated with the fingerprint information of the $j^{th}$ second sub-input as the $j^{th}$ second mark of the $j^{th}$ second object.

It should be noted that in this case, a plurality of pieces of different fingerprint information are preset, different fingerprint information corresponds to different second identifiers, and an object is marked by using different fingerprint information. For example, a mark corresponding to fingerprint information of an index finger is 1, and a mark corresponding to fingerprint information of a middle finger is 2. When the user marks an application icon by using the middle finger, and the terminal obtains the mark 2 corresponding to the fingerprint information of the middle finger, the terminal marks the application icon as 2. To clearly let the user know a sequence of marks, a corresponding mark number is displayed below each application icon.

It should be further noted that, to facilitate identifying the second object marked by the user, a marking box needs to be displayed on the second object. The marking box is a preset shape. The preset shape may be a regular shape such as a circle, a square, a diamond, or a triangle, or may be an irregular shape defined by the user. The marking box is used to clearly indicate the second object marked by the user, so that the user can distinguish the marked second object.

It should be noted that, in this case, the user directly performs different marking by using a plurality of objects, so that a plurality of pairs of objects are quickly switched, thereby reducing operation time and improving user experience.

In a second manner, there are K second objects, and K is an integer greater than or equal to 1.

It should be noted that in this case, the specific implementation of marking the second object by using the second mark is:

marking the K second objects by using K second marks based on the fourth input feature.

It should be noted that in this case, the user may perform the second input once to mark at least one object at the same time. Specifically, a quantity of objects that can be marked may be preset by the user and stored in the electronic device.

Further, it should be noted that the second input is a touch input performed by the user in a target area on a target interface, the target area does not include the first object or the second object, and the fourth input feature includes K touch points. Specifically, an implementation of marking the K second objects by using the K second marks based on the fourth input feature includes:

sequentially marking the K second objects from a preset object on the target interface, where the preset object includes an object of a preset type or an object at a preset position.

In a case that the preset object is the object of the preset type, the K second objects are objects of a same type. That is, in this case, the electronic device marks the objects of the same type. For example, if a type of the second object is online shopping, the electronic device sequentially marks K application icons whose types are online shopping starting from a first application icon whose type is a network on the target interface.

In a case that the preset object is the object at the preset position, the K second objects are objects at adjacent arrangement positions or objects at preset arrangement intervals. That is, in this case, the electronic device marks adjacent first objects or first objects arranged into a preset rule (for example, marks one application icon every other application icon). For example, the user performs the second input by using K fingers, and the electronic device marks K application icons from a first application icon on the target interface, or starting from a first application icon on the target interface, the electronic device marks one application icon every two application icons until the K application icons are marked.

It should be noted that, in this case, an operation manner of simultaneously marking a plurality of objects avoids individual marking of an object, reduces interaction time, and meets a requirement for using the electronic device by the user in more scenarios.

It should be further noted that after marking the second object, the user may further exchange marks of different objects. A specific implementation is: receiving a preset input performed by the user on a third target object and a fourth target object in the second objects; and exchanging a second identifier of the third target object and a second identifier of the fourth target object in the second objects in response to the preset input.

It should be noted that the preset input may be a tap input, a long press and hold input, a slide input, or the like. Specifically, an optional implementation of receiving the preset input performed by the user on the third target object and the fourth target object in the second objects is:

receiving the preset input through which the user moves the third target object to a position that at least partially overlaps the fourth target object.

It should be noted that, the preset input is used to exchange mark numbers of different objects, so that the user can flexibly switch objects.

It should be further noted that the first object is an object on a first interface, and the second object is an object on a second interface. To enable the user to better understand a specific to-be-switched object when switching the first object and the second object, before step 104, the method further includes:

receiving a fifth input performed by the user in a blank area on the second interface; and displaying the marked first object in response to the fifth input.

In this case, when the first object and the second object are switched, the to-be-switched first object is first displayed in a blank position on the interface on which the second object is located, to remind the user of the marked object on the first interface, so that the user can clearly know the marked object on the first interface, thereby assisting the user in accurately switching objects.

Specifically, an implementation of displaying the marked first object in response to the fifth input is: obtaining a fifth input feature of the fifth input; and displaying the marked first object in a case that the fifth input feature is the same as an input feature of the first input.

In this case, the input feature of the fifth input should be the same as an input feature used when the first object is marked. For example, when specific fingerprint information is used to mark the first object, and the first object is displayed, the fifth input should also be performed by using a finger having input fingerprint information. When the first object is marked by using unused fingerprint information, and the first object is displayed, if the fifth input is performed by using a particular finger, and the marked first object corresponding to fingerprint information of the finger is displayed.

Specifically, another implementation of displaying the marked first object in response to the fifth input is:

obtaining fingerprint information of the fifth input and an input manner of the fifth input; and displaying the marked first object in a case that the fingerprint information of the fifth input is preset second fingerprint information and the input manner of the fifth input is a preset input manner.

In this case, the fifth input for displaying the first object is not associated with the input feature for marking the first object. When displaying the first object, the fingerprint information of the fifth input may be specific fingerprint information, and the fifth input may be performed once to display one first object, or the fifth input may be performed once to display a plurality of first objects. It should be noted that in this manner, the user does not need to remember the input feature for marking the first object, and the user does not need to record a correspondence between the fingerprint information and the input feature for marking the first object, so that a display speed of the first object can be increased, and an object switching time can be shortened.

Figure 6:
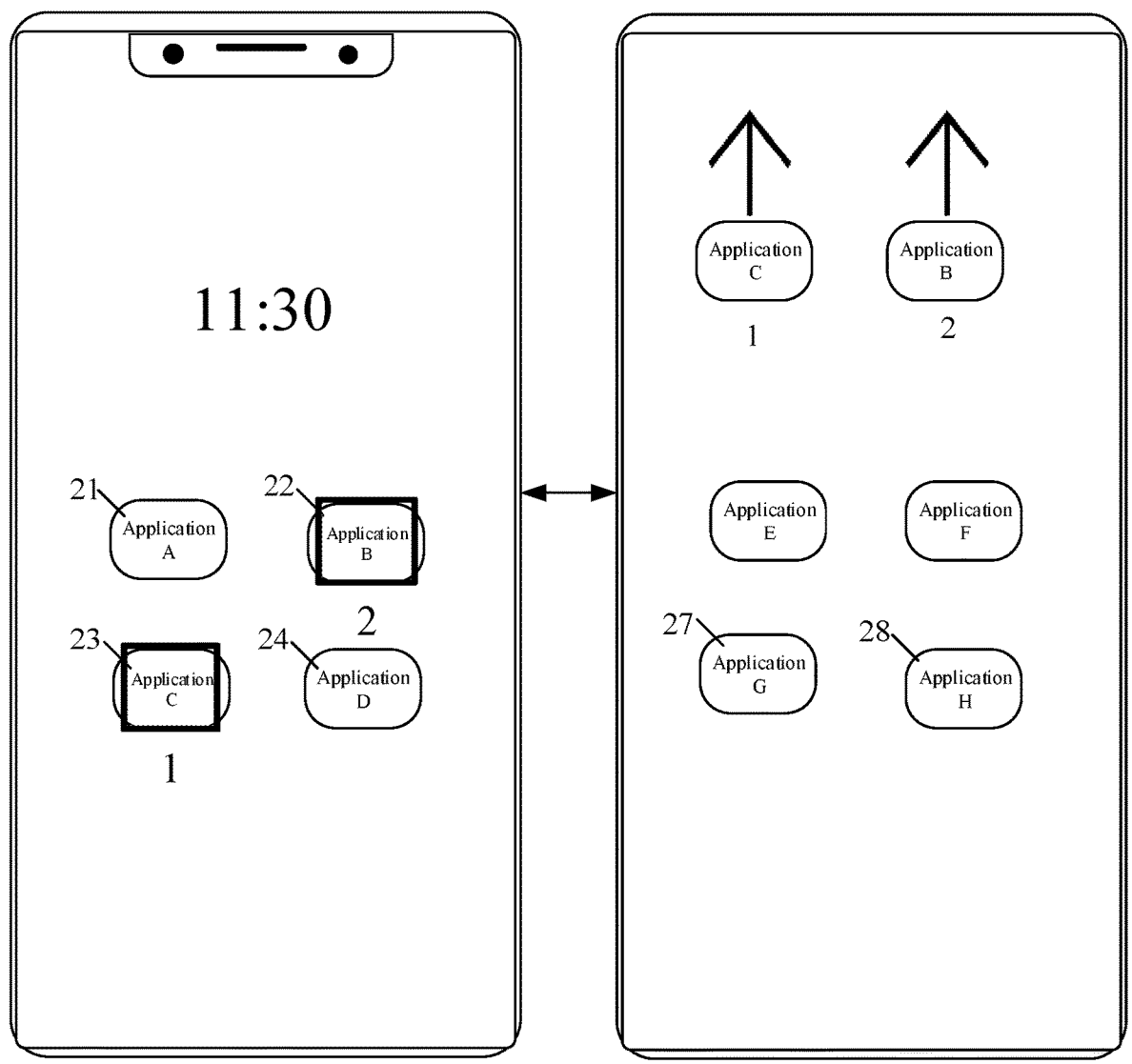
FIG. 6 is a first schematic diagram of a user operation status of moving an application icon across screens.

For example, as shown in FIG. 6, a left side in FIG. 6 represents a first screen desktop of the electronic device, and a right side represents a second screen desktop of the electronic device. When the user performs a slide operation in an arrow direction in the figure at a blank position on the second screen desktop for the first time, an icon 23 corresponding to an application C is moved to the blank position on the second screen desktop. When a slide operation is performed for the second time, an icon 22 corresponding to an application B is moved to the blank position on the second screen desktop. An application icon that is moved to the second screen desktop also has a mark number, and the user may also adjust the mark number of the application icon on the second screen desktop.

It should be noted that a position of the marked application icon operated by the user on the second screen desktop is exchanged with a position of a marked application icon on the first screen desktop. Herein, it should be noted that positions of the application icons are exchanged based on mark numbers, that is, after the second input is performed, positions of application icons with a same mark number on different desktops are switched.

Figure 7:
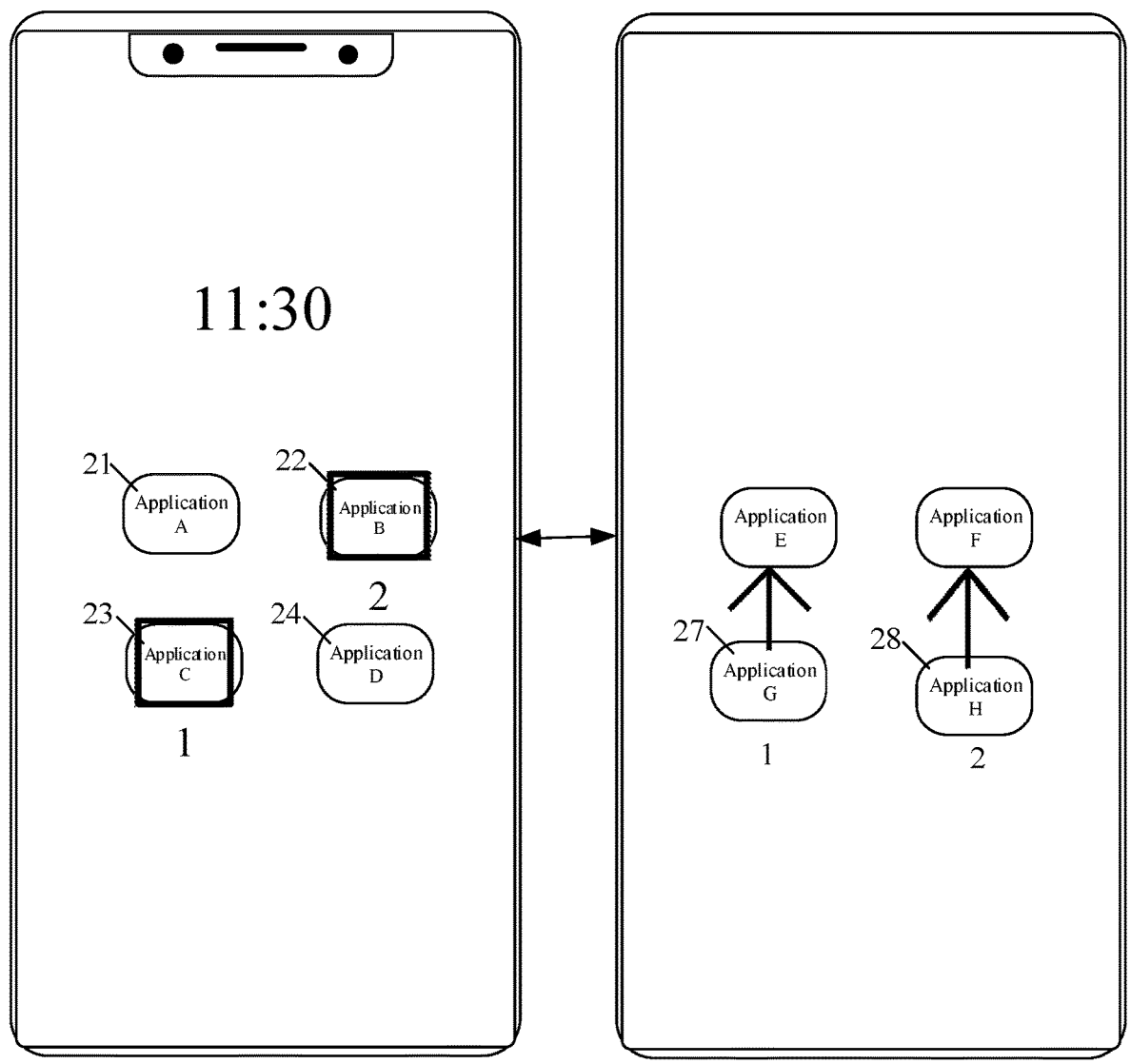
FIG. 7 is a second schematic diagram of a user operation status of moving an application icon across screens.

For example, as shown in FIG. 7, a left side in FIG. 7 represents a first screen desktop of the electronic device, and a right side represents a second screen desktop of the electronic device. A slide operation is performed on an icon 27 corresponding to an application G on the second screen desktop in an arrow direction. Because a mark number of the icon 27 corresponding to the application G is 1, a position of the icon 27 corresponding to the application G is exchanged with a position of an icon 23 that is corresponding to the application C and whose mark number is 1 on the first screen desktop. A slide operation is performed on an icon 28 corresponding to an application H on the second screen desktop in an arrow direction. Because a mark number of the icon 28 corresponding to the application H is 2, a position of the icon 28 corresponding to the application H is exchanged with a position of an icon 22 that is corresponding to an application B and whose mark number is 2 on the first screen desktop.

The following separately describes the foregoing implementations by using examples from a perspective of a mark of an icon and a switching manner.

Example 1: An operation is performed by using a same finger for a plurality of times on both the first screen desktop and the second screen desktop to mark icons one by one, and objects are switched through an input performed by the user by using a mark of the second object first. During the switching, the marked first object does not need to be displayed on the second screen desktop.

On the first screen desktop, the user respectively marks an icon A, an icon B, and an icon C by using one finger, and mark numbers corresponding to the icon A, the icon B, and the icon C are respectively 1, 2, and 3. On the second screen desktop, the user marks an icon E, an icon F, and an icon G by using one finger, and mark numbers corresponding to the icon E, the icon F, and the icon G are respectively 1, 2, and 3. When the user performs a slide operation on the second screen desktop by pressing and holding the marked icon E, a position of the icon E is switched with a position of the icon A on the first screen desktop, and after the switching, the icon E is displayed at the position of the icon A, and the icon A is displayed at the position of the icon E.

Example 2: An operation is performed by using a same finger for a plurality of times both the first screen desktop and the second screen desktop to mark icons one by one, and objects are switched through an input performed by the user by using a mark of the second object first. During the switching, the marked first object needs to be displayed on the second screen desktop.

On the first screen desktop, the user respectively marks an icon A, an icon B, and an icon C by using one finger, and mark numbers corresponding to the icon A, the icon B, and the icon C are respectively 1, 2, and 3. On the second screen desktop, the user marks an icon E, an icon F, and an icon G by using one finger, and mark numbers corresponding to the icon E, the icon F, and the icon G are respectively 1, 2, and 3. When the user performs sliding by using a finger at a blank position on the second screen desktop, an icon on the first screen desktop is displayed at the blank position. For example, one icon is displayed if the finger slides in ascending order of mark numbers on the first screen desktop. If the user performs a slide operation on the second screen desktop by pressing and holding the marked icon E, a position of the icon E is switched with a position of the icon A on the first screen desktop, and after the switching, the icon E is displayed at the position of the icon A, and the icon A is displayed at the position of the icon E.

Example 3: Operations are performed by using different fingers on both the first screen desktop and the second screen desktop to mark icons, and objects are switched through an input performed by the user by using a mark of the second object first. During the switching, the marked first object does not need to be displayed on the second screen desktop.

On the first screen desktop, if the user marks an icon A by using a middle finger, marks an icon B by using an index finger, and marks an icon C by using a thumb, and mark numbers corresponding to the middle finger, the index finger, and the thumb are respectively 1, 2, and 3, mark numbers corresponding to the icon A, the icon B, and the icon C are also respectively 1, 2, and 3. On the second screen desktop, if the user marks an icon E by using a middle finger, marks an icon F by using an index finger, and marks an icon G by using a thumb, and mark numbers corresponding to the middle finger, the index finger, and the thumb are respectively 1, 2, and 3, mark numbers corresponding to the icon E, the icon F, and the icon G are also respectively 1, 2, and 3. When the user performs a slide operation on the second screen desktop by pressing and holding the marked icon F by using the index finger, a position of the icon F is switched with a position of the icon B on the first screen desktop. After the switching, the icon F is displayed at the position of the icon B, and the icon B is displayed at the position of the icon F.

Example 4: Operations are performed by using different fingers on both the first screen desktop and the second screen desktop to mark icons one by one, and objects are switched through an input performed by the user by using a mark of the second object first. During the switching, the marked first object needs to be displayed on the second screen desktop.

On the first screen desktop, if the user marks an icon A by using a middle finger, marks an icon B by using an index finger, and marks an icon C by using a thumb, and mark numbers corresponding to the middle finger, the index finger, and the thumb are respectively 1, 2, and 3, mark numbers corresponding to the icon A, the icon B, and the icon C are also respectively 1, 2, and 3. On the second screen desktop, if the user marks an icon E by using a middle finger, marks an icon F by using an index finger, and marks an icon G by using a thumb, and mark numbers corresponding to the middle finger, the index finger, and the thumb are respectively 1, 2, and 3, mark numbers corresponding to the icon E, the icon F, and the icon G are also respectively 1, 2, and 3. The user slides by using the middle finger to display the icon A on the first screen desktop at a blank position on the second screen desktop, and slides by using the index finger to display the icon B on the first screen desktop at the blank position. If the user performs a slide operation on the second screen desktop by pressing and holding the marked icon E, a position of the icon E is switched with a position of the icon A on the first screen desktop. After the switching, the icon E is displayed at the position of the icon A, and the icon A is displayed at the position of the icon E.

Example 5: An operation is performed once by using a plurality of fingers on both the first screen desktop and the second screen desktop to mark a plurality of one by one, and objects are switched through an input performed by the user by using a mark of the second object first. During the switching, the marked first object does not need to be displayed on the second screen desktop.

On the first screen desktop, if the user slides by using three fingers to mark an icon A, an icon B, and an icon C simultaneously, mark numbers of the three icons are determined based on an arrangement sequence on the desktop, and are respectively 1, 2, and 3. On the second screen desktop, if the user slides by using three fingers to mark an icon E, an icon F, and an icon G simultaneously, mark numbers of the three icons are determined based on an arrangement sequence on the desktop, and are respectively 1, 2, and 3. When the user performs a slide operation on the second screen desktop by using three fingers, a position of the icon E is switched with a position of the icon A on the first screen desktop, a position of the icon F is switched with a position of the icon B on the first screen desktop, and a position of the icon G is switched with a position of the icon C on the first screen desktop.

Example 6: An operation is performed once by using a plurality of fingers on both the first screen desktop and the second screen desktop to mark a plurality of one by one, and objects are switched through an input performed by the user by using a mark of the second object first. During the switching, the marked first object needs to be displayed on the second screen desktop.

On the first screen desktop, if the user slides by using three fingers to mark an icon A, an icon B, and an icon C simultaneously, mark numbers of the three icons are determined based on an arrangement sequence on the desktop, and are respectively 1, 2, and 3. On the second screen desktop, if the user slides by using three fingers to mark an icon E, an icon F, and an icon G simultaneously, mark numbers of the three icons are determined based on an arrangement sequence on the desktop, and are respectively 1, 2, and 3. When the user slides by using the three fingers on the second screen desktop to display the three marked icons on the first screen desktop at a blank position, and performs a slide operation by pressing and holding the marked icon E, a position of the icon E is switched with a position of the icon A on the first screen desktop. After the switching, the icon E is displayed at the position of the icon A, and the icon A is displayed at the position of the icon E.

Figure 8:
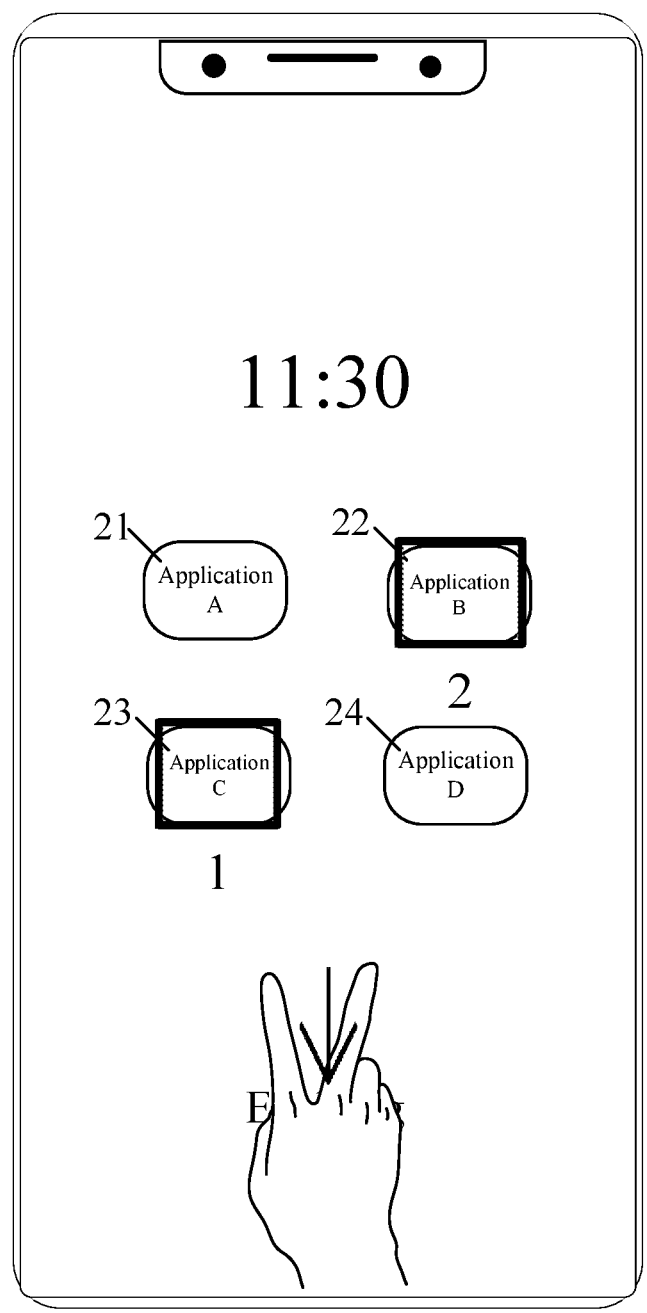
FIG. 8 is a schematic diagram of a user operation status of cancelling a previous operation.

It should be further noted that the user may further cancel a previous operation on an application icon. For example, the user performs an operation of exchanging a mark number of an icon 22 corresponding to an application B with a mark number of an icon 23 corresponding to an application C. However, the user does not want to perform such an exchange. As shown in FIG. 8, if the user performs a slide-down operation by using two fingers in an arrow direction at a blank position on the desktop, the electronic device cancels the previous operation of adjusting the mark numbers. After the operation is canceled, the mark number of the icon 22 corresponding to the application B is 2, and the mark number of the icon 23 corresponding to the application C is 1.

Figure 9:
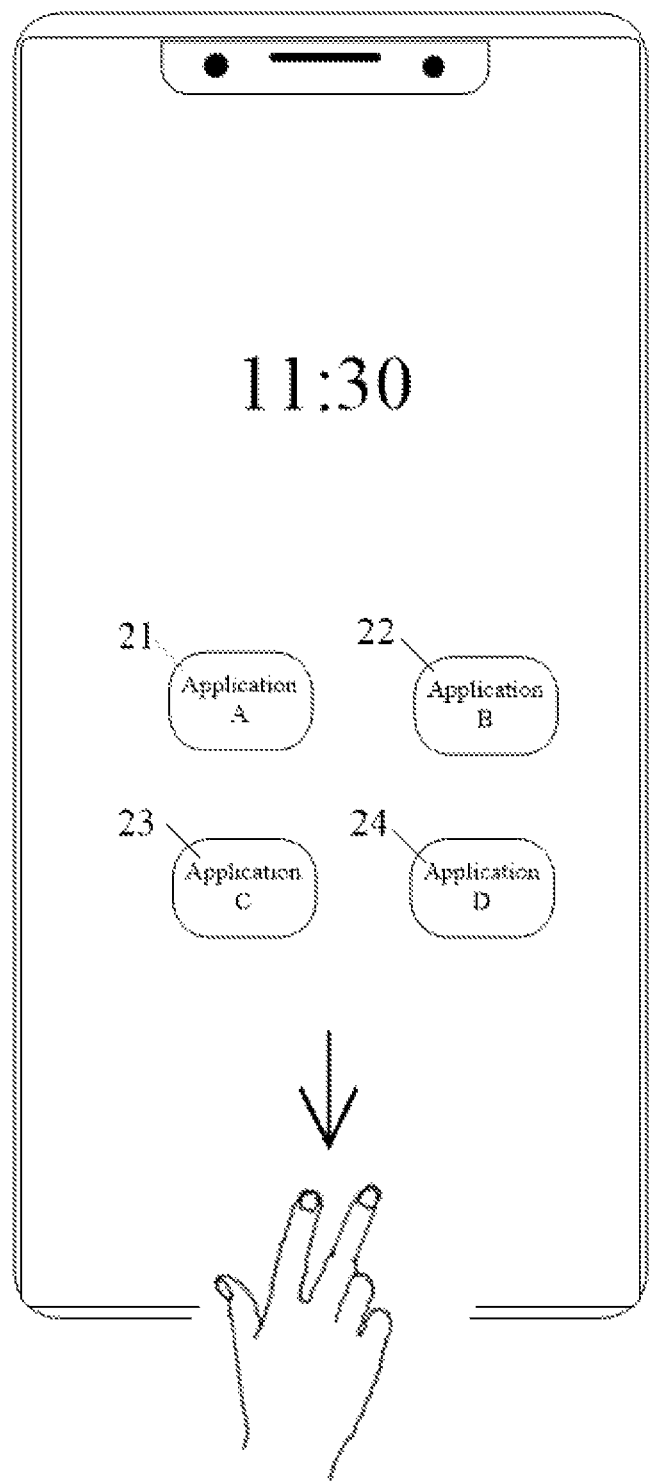
FIG. 9 is a schematic diagram of a user operation status of exiting a mode of adjusting a position of an application icon.
Figure 10:
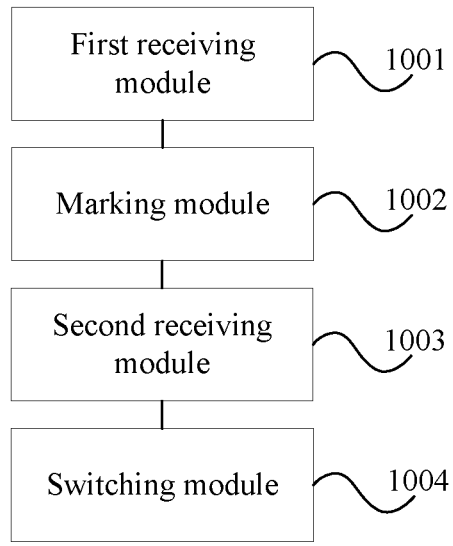
FIG. 10 is a first schematic module diagram of an electronic device according to an embodiment of the present disclosure.
Figure 11:
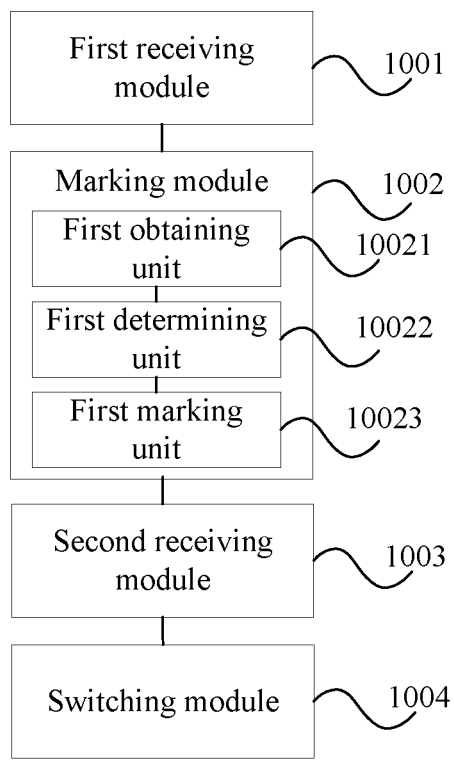
FIG. 11 is a second schematic module diagram of an electronic device according to an embodiment of the present disclosure.
Figure 12:
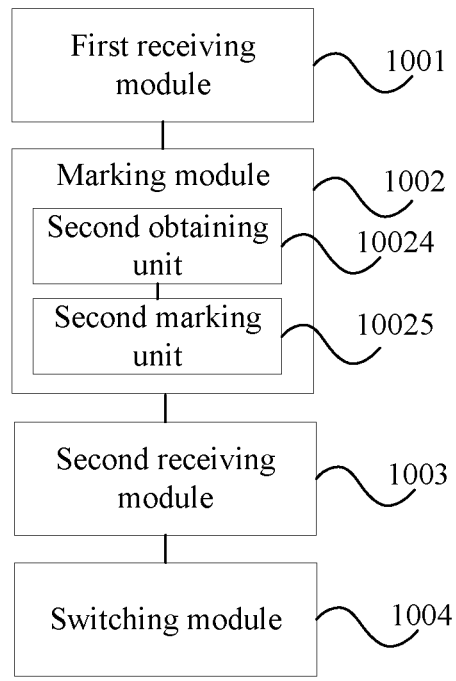
FIG. 12 is a third schematic module diagram of an electronic device according to an embodiment of the present disclosure.
Figure 13:
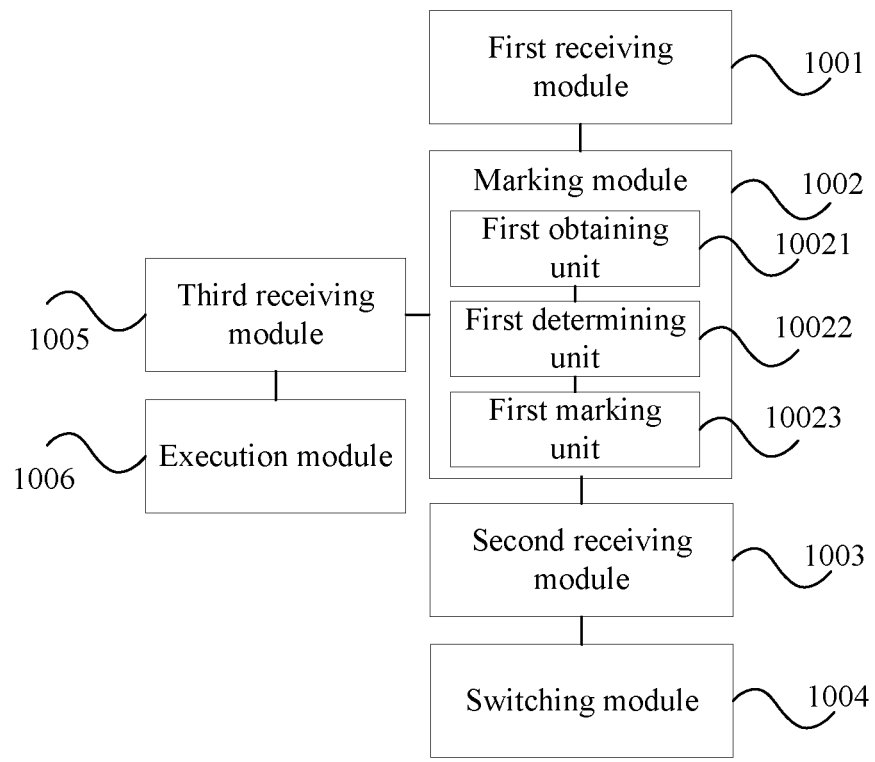
FIG. 13 is a fourth schematic module diagram of an electronic device according to an embodiment of the present disclosure.
Figure 14:
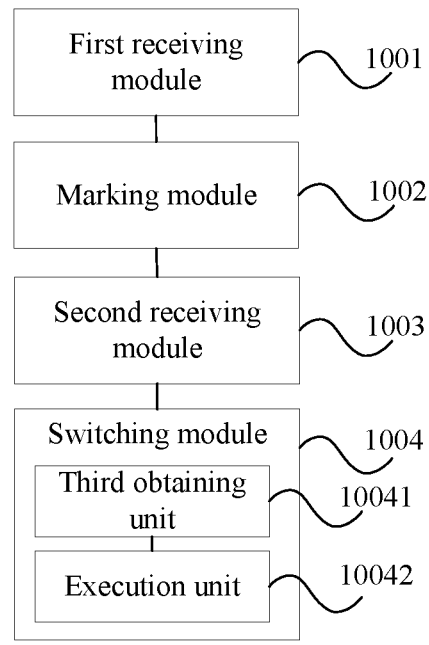
FIG. 14 is a fifth schematic module diagram of an electronic device according to an embodiment of the present disclosure.
Figure 15:
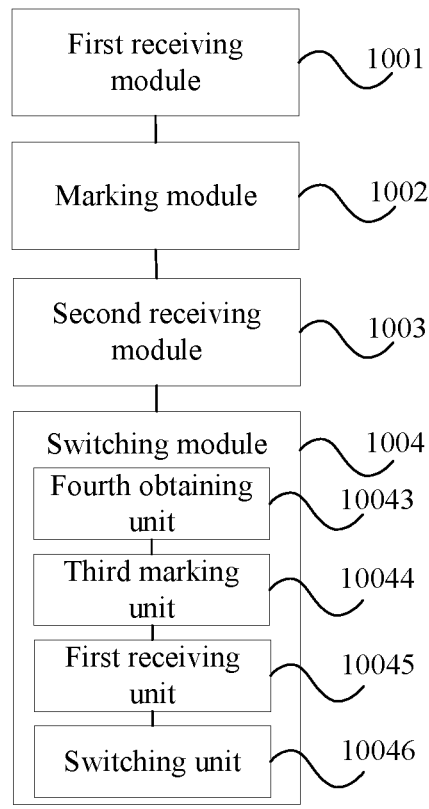
FIG. 15 is a sixth schematic module diagram of an electronic device according to an embodiment of the present disclosure.
Figure 16:
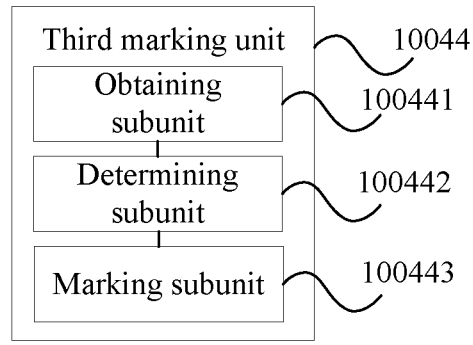
FIG. 16 is a schematic module diagram of a third marking unit of an electronic device according to an embodiment of the present disclosure.
Figure 17:
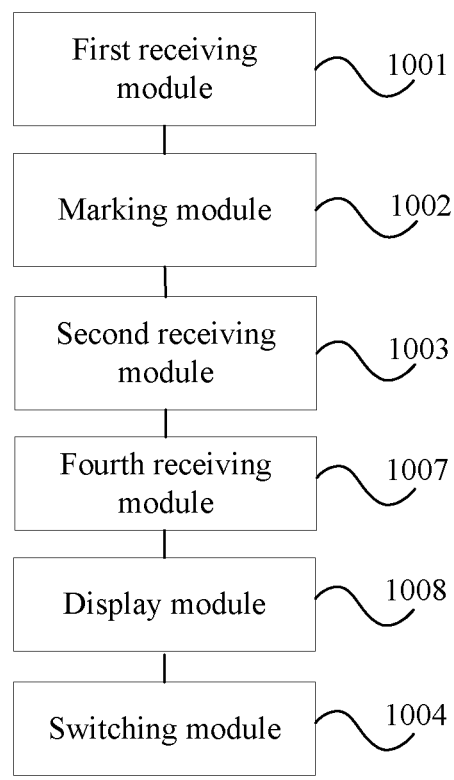
FIG. 17 is a seventh schematic module diagram of an electronic device according to an embodiment of the present disclosure.
Figure 18:
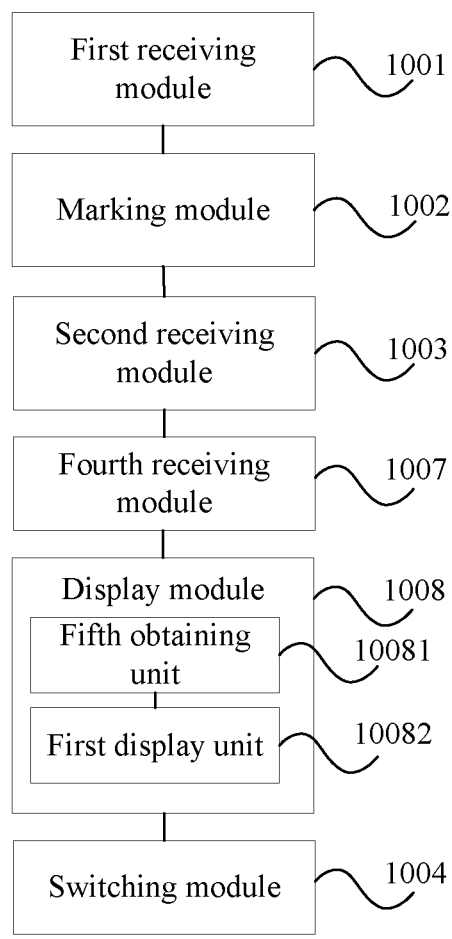
FIG. 18 is an eighth schematic module diagram of an electronic device according to an embodiment of the present disclosure.
Figure 19:
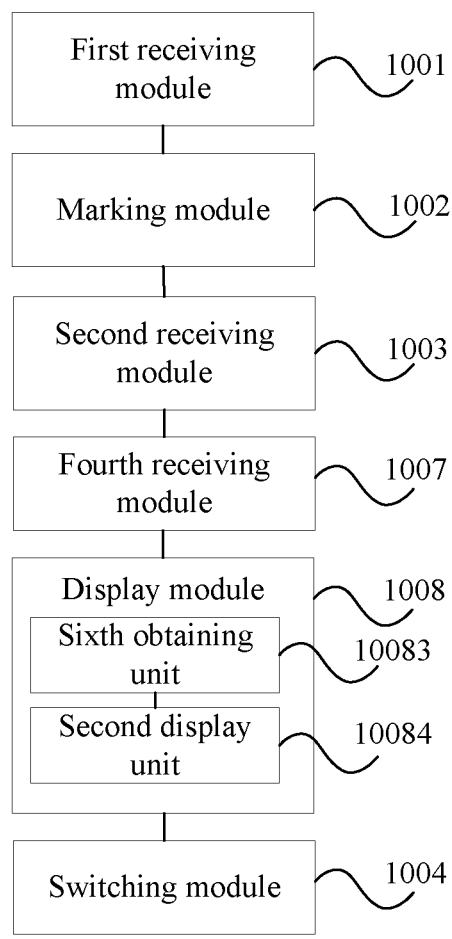
FIG. 19 is a ninth schematic module diagram of an electronic device according to an embodiment of the present disclosure.

It should be further noted that when the user does not need to adjust a position of an application icon, the user needs to exit a mode of adjusting the position of the application icon. On a desktop of the electronic device, the user performs a predetermined operation to exit the mode of adjusting the position of the application icon. For example, the user may perform a slide operation on the desktop to exit the mode of adjusting the position of the application icon. As shown in FIG. 9, the user slides by using three fingers in an arrow direction in the figure to reach the bottom of the screen (the arrow direction in FIG. 9 indicates a slide direction of the fingers), thereby exiting the mode of adjusting the position of the application icon.

It should be noted that in this embodiment of the present disclosure, different operation intentions may be distinguished by using slide operations performed by using different quantities of fingers. For example, when the user performs a slide operation by using three fingers, the electronic device enters or exits the mode of adjusting the position of the application icon. When the user performs a slide operation by using two fingers, the electronic device performs an operation of canceling the previous operation on the application icon.

In this embodiment of the present disclosure, the user does not need to manually drag icons on the desktop one by one, so that application icons can be quickly adjusted across desktops, and operations are convenient and time-saving, thereby improving user experience.

As shown in FIG. 10 to FIG. 19, an embodiment of the present disclosure further provides an electronic device, including:
a first receiving module 1001, configured to receive a first input performed by a user;
a marking module 1002, configured to mark a first object by using a first mark in response to the first input;
a second receiving module 1003, configured to receive a second input performed by the user; and
a switching module 1004, configured to switch positions of the first object and a second object in response to the second input.

Optionally, there are N first objects, N is an integer greater than or equal to 1, the first input includes N first sub-inputs, and each first sub-input acts on one first object; and
the marking module 1002 includes:
a first obtaining unit 10021, configured to obtain a first input feature of an $i^{th}$ first sub-input;
a first determining unit 10022, configured to determine an $i^{th}$ first mark of an $i^{th}$ first object based on the first input feature; and
a first marking unit 10023, configured to mark the $i^{th}$ first object by using the $i^{th}$ first mark, where
i is a positive integer, and i≤ N.

Further, the first input feature is an input sequence and fingerprint information that are of the $i^{th}$ first sub-input; and
the first determining unit 10022 is configured to:
in a case that the fingerprint information of the $i^{th}$ first sub-input is preset first fingerprint information, determine the $i^{th}$ first mark of the $i^{th}$ first object based on the input sequence of the $i^{th}$ first sub-input.

Further, the first input feature is fingerprint information of the $i^{th}$ first sub-input, and fingerprint information of each first sub-input is different; and the first determining unit 10022 is configured to:
determine a mark associated with the fingerprint information of the $i^{th}$ first sub-input as the $i^{th}$ first mark of the $i^{th}$ first object.

Optionally, there are M first objects, and M is an integer greater than or equal to 1; and the marking module 1002 includes:
a second obtaining unit 10024, configured to obtain a second input feature of the first input; and
a second marking unit 10025, configured to mark the M first objects by using M first marks based on the second input feature.

Further, the first input is a touch input performed by the user in a target area on a target interface, the target area does not include the first object or the second object, and the second input feature includes M touch points; and the second marking unit 10025 is configured to:
sequentially mark the M first objects from a preset object on the target interface, where
the preset object includes an object of a preset type or an object at a preset position;
in a case that the preset object is the object of the preset type, the M first objects are objects of a same type; and in a case that the preset object is the object at the preset position, the M first objects are objects at adjacent arrangement positions or objects at preset arrangement intervals.

Optionally, after the marking module 1002 marks the first object by using the first mark in response to the first input, the electronic device further includes:

a third receiving module 1005, configured to receive a third input performed by the user on a first target object and a second target object in the N first objects; and
an execution module 1006, configured to exchange a first identifier of the first target object and a first identifier of the second target object in the first objects in response to the third input.

Specifically, the third receiving module 1005 is configured to:
receive the third input through which the user moves the first target object to a position that at least partially overlaps the second target object.

Optionally, the switching module 1004 includes:
a third obtaining unit 10041, configured to obtain a third input feature of the second input; and
an execution unit 10042, configured to mark the second object by using the second mark based on the third input feature, and switch the positions of the first object and the second object in a case that the second mark matches the first mark.

Optionally, the switching module 1004 includes:
a fourth obtaining unit 10043, configured to obtain a fourth input feature of the second input;
a third marking unit 10044, configured to mark the second object by using the second mark based on the fourth input feature;
a first receiving unit 10045, configured to receive a fourth input performed by the user; and
a switching unit 10046, configured to switch the positions of the first object and the second object in response to the fourth input in a case that a first identifier matches a second identifier.

Further, there are H second objects, H is an integer greater than or equal to 1, the second input includes H second sub-inputs, and each second sub-input acts on one second object; and the third marking unit 10044 includes:
an obtaining subunit 100441, configured to obtain a fourth input feature of a $j^{th}$ second sub-input;
a determining subunit 100442, configured to determine a $j^{th}$ second mark of a $j^{th}$ second object based on the fourth input feature; and
a marking subunit 100443, configured to the $j^{th}$ second object by using the $j^{th}$ second mark, where
j is a positive integer, and j≤ H.

Specifically, the fourth input feature is an input sequence and fingerprint information that are of the $j^{th}$ first sub-input; and the determining subunit 100442 is configured to:
in a case that the fingerprint information of the $j^{th}$ second sub-input is preset second fingerprint information, determine the $j^{th}$ second mark of the $j^{th}$ second object based on the input sequence of the $j^{th}$ second sub-input.

Specifically, the fourth input feature is fingerprint information of the $j^{th}$ second sub-input, and fingerprint information of each second sub-input is different; and the determining subunit 100442 is configured to:
determine a mark associated with the fingerprint information of the $j^{th}$ second sub-input as the $j^{th}$ second mark of the $j^{th}$ second object.

Further, there are K second objects, and K is an integer greater than or equal to 1; and the third marking unit 10044 is configured to:
mark the K second objects by using K second marks based on the fourth input feature.

Specifically, the second input is a touch input performed by the user in a target area on a target interface, the target area does not include the first object or the second object, and the fourth input feature includes K touch points; and when marking the K second objects by using K second marks based on the fourth input feature, the third marking unit 10044 is further configured to:
sequentially mark the K second objects from a preset object on the target interface, where
the preset object includes an object of a preset type or an object at a preset position; in a case that the preset object is the object of the preset type, the K second objects are objects of a same type; and in a case that the preset object is the object at the preset position, the K second objects are objects at adjacent arrangement positions or objects at preset arrangement intervals.

Optionally, the first object is an object on a first interface, and the second object is an object on a second interface; and
before the switching module 1004 switches the positions of the first object and the second object in response to the second input, the electronic device further includes:
a fourth receiving module 1007, configured to receive a fifth input performed by the user in a blank area on the second interface; and
a display module 1008, configured to display the marked first object in response to the fifth input.

Optionally, the display module 1008 includes:
a fifth obtaining unit 10081, configured to obtain a fifth input feature of the fifth input; and
a first display unit 10082, configured to display the marked first object in a case that the fifth input feature is the same as an input feature of the first input.

Further, the display module 1008 includes:

a sixth obtaining unit 10083, configured to obtain fingerprint information of the fifth input and an input manner of the fifth input; and a second display unit 10084, configured to display the marked first object in a case that the fingerprint information of the fifth input is preset second fingerprint information and the input manner of the fifth input is a preset input manner.

The electronic device provided in this embodiment of the present disclosure can implement the processes implemented by the electronic device in the method embodiment in FIG. 1. To avoid repetition, details are not described herein again. According to the electronic device in this embodiment of the present disclosure, a first input performed by a user is received, a first object is marked by using a first mark in response to the first input, a second input performed by the user is received, and positions of the first object and a second object are switched in response to the second input. In this manner, the user does not need to manually drag objects on a desktop one by one, so that a position of an object can be quickly adjusted. In this manner, the user does not need to manually drag icons on desktops one by one, so that application icons can be quickly adjusted across desktops, and operations are convenient and time-saving.

Figure 20:
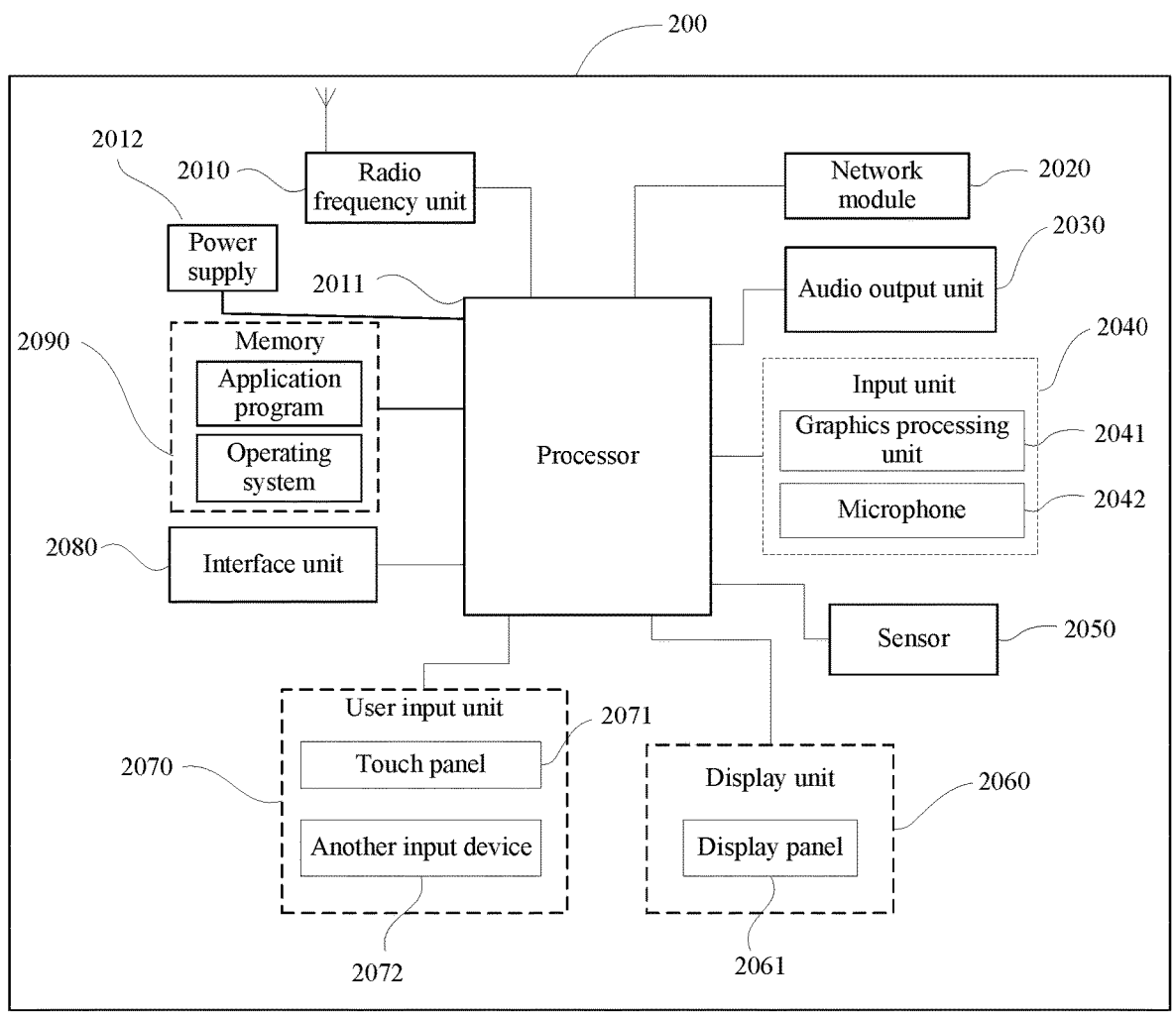
FIG. 20 is a schematic structural diagram of hardware of an electronic device according to an embodiment of the present disclosure.

FIG. 20 is a structural diagram of hardware of an electronic device according to an embodiment of the present disclosure.

An electronic device 200 includes but is not limited to components such as a radio frequency unit 2010, a network module 2020, an audio output unit 2030, an input unit 2040, a sensor 2050, a display unit 2060, a user input unit 2070, an interface unit 2080, a memory 2090, a processor 2011, and a power supply 2012. A person skilled in the art may understand that a structure of the electronic device shown in FIG. 20 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle electronic device, a wearable device, a pedometer, and the like.

The processor 2011 is configured to: receive a first input performed by a user through the user input unit 2070; mark a first object by using a first mark in response to the first input; receive a second input performed by the user through the user input unit 2070; and switch positions of the first object and a second object in response to the second input.

The second object is marked by using a second mark.

According to the electronic device in this embodiment of the present disclosure, a first input performed by a user is received, a first object is marked by using a first mark in response to the first input, a second input performed by the user is received, and positions of the first object and a second object are switched in response to the second input. In this manner, the user does not need to manually drag objects on a desktop one by one, so that a position of an object can be quickly adjusted. In this manner, the user does not need to manually drag icons on desktops one by one, so that application icons can be quickly adjusted across desktops, and operations are convenient and time-saving.

It should be understood that, in this embodiment of the present disclosure, the radio frequency unit 2010 may be configured to receive and send information or a signal in a call process. Specifically, after receiving downlink data from a base station, the radio frequency unit 2010 sends the downlink data to the processor 2011 for processing. In addition, the radio frequency unit 2010 sends uplink data to the base station. Usually, the radio frequency unit 2010 includes but is not limited to an antenna, at least one amplifier, a transceiver, a coupler, a low noise amplifier, a duplexer, and the like. In addition, the radio frequency unit 2010 may communicate with a network and another device through a wireless communication system.

The electronic device provides wireless broadband Internet access for the user by using the network module 2020, for example, helping the user to send and receive an e-mail, brows a web page, and access streaming media.

The audio output unit 2030 may convert audio data received by the radio frequency unit 2010 or the network module 2020 or stored in the memory 2090 into an audio signal and output the audio signal as a sound. In addition, the audio output unit 2030 may further provide an audio output (for example, a call signal received voice, or a message received voice) related to a specific function implemented by the electronic device 200. The audio output unit 2030 includes a speaker, a buzzer, a telephone receiver, and the like.

The input unit 2040 is configured to receive an audio signal or a video signal. The input unit 2040 may include a graphics processing unit (GPU) 2041 and a microphone 2042, and the graphics processing unit 2041 processes image data of a still picture or video obtained by an image capture apparatus (such as a camera) in a video capture mode or an image capture mode. A processed image frame may be displayed on the display unit 2060. The image frame processed by the graphics processing unit 2041 may be stored in the memory 2090 (or another storage medium) or sent by using the radio frequency unit 2010 or the network module 2020. The microphone 2042 may receive a sound and can process such sound into audio data. Processed audio data may be converted, in a call mode, into a format that can be sent to a mobile communication base station by using the radio frequency unit 2010 for output.

The electronic device 200 further includes at least one sensor 2050 such as a light sensor, a motion sensor, and another sensor. Specifically, the light sensor includes an ambient light sensor and a proximity sensor. The ambient light sensor may adjust luminance of the display panel 2061 based on brightness of ambient light. The proximity sensor may turn off the display panel 2061 and/or backlight when the electronic device 200 moves to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 2050 may further include a fingerprint sensor, a pressure sensor, an iris sensor, a molecular sensor, a gyroscope, a barometer, a hygrometer, a thermometer, an infrared sensor, and the like. Details are not described herein.

The display unit 2060 is configured to display information entered by a user or information provided for a user. The display unit 206 may include a display panel 2061. The display panel 2061 may be configured in a form of a liquid crystal display (LCD), an organic light-emitting diode (OLED), or the like.

The user input unit 2070 may be configured to: receive entered digital or character information, and generate key signal input related to a user setting and function control of the electronic device. Specifically, the user input unit 2070 includes a touch panel 2071 and another input device 2072. The touch panel 2071 is also referred to as a touchscreen, and may collect a touch operation performed by a user on or near the touch panel 2071 (such as an operation performed by a user on the touch panel 2071 or near the touch panel 2071 by using any proper object or accessory, such as a finger or a stylus). The touch panel 2071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 2011, and can receive and execute a command sent by the processor 2011. In addition, the touch panel 2071 may be of a resistive type, a capacitive type, an infrared type, a surface acoustic wave type, or the like. The user input unit 207 may include another input device 2072 in addition to the touch panel 2071. Specifically, the another input device 2072 may include but is not limited to a physical keyboard, a functional button (such as a volume control button or a power on/off button), a trackball, a mouse, and a joystick. Details are not described herein.

Further, the touch panel 2071 may cover the display panel 2061. When detecting the touch operation on or near the touch panel 2071, the touch panel 2071 transmits the touch operation to the processor 2011 to determine a type of a touch event, and then the processor 2011 provides corresponding visual output on the display panel 2061 based on the type of the touch event. In FIG. 20, although the touch panel 2071 and the display panel 2061 are used as two independent parts to implement input and output functions of the electronic device, in some embodiments, the touch panel 2071 and the display panel 2061 may be integrated to implement the input and output functions of the electronic device. This is not specifically limited herein.

The interface unit 2080 is an interface for connecting an external apparatus with the electronic device 200. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 2080 may be configured to receive input (for example, data information and power) from an external apparatus and transmit the received input to one or more elements in the electronic device 200 or may be configured to transmit data between the electronic device 200 and an external apparatus.

The memory 2090 may be configured to store a software program and various data. The memory 2090 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 2090 may include a high-speed random access memory, and may further include a nonvolatile memory, for example, at least one magnetic disk storage component, a flash memory component, or another volatile solid-state storage component.

The processor 2011 is a control center of the electronic device, connects all parts of the entire electronic device by using various interfaces and lines, and performs various functions of the electronic device and data processing by running or executing a software program and/or a module that are/is stored in the memory 2090 and by invoking data stored in the memory 2090, to overall monitor the electronic device. The processor 2011 may include one or more processing units. Optionally, an application processor and a modem processor may be integrated into the processor 2011. The application processor mainly processes an operating system, a user interface, an application program, and the like. The modem processor mainly processes wireless communications. It can be understood that, alternatively, the modem processor may not be integrated into the processor 2011.

The electronic device 200 may further include the power supply 2012 (such as a battery) that supplies power to each component. Optionally, the power supply 2012 may be logically connected to the processor 2011 by using a power supply management system, so as to implement functions such as charging and discharging management, and power consumption management by using the power supply management system.

In addition, the electronic device 200 includes some function modules not shown, and details are not described herein.

Optionally, an embodiment of the present disclosure further provides an electronic device, including a processor 2011, a memory 2090, and a computer program that is stored in the memory 2090 and that can be run on the processor 2011. When the computer program is executed by the processor 2011, the processes of the foregoing object position adjustment method embodiment are implemented and a same technical effect can be achieved. To avoid repetition, details are not described herein again.

An embodiment of the present disclosure further provides a computer-readable storage medium. The computer-readable storage medium stores a computer program, and when executing the computer program, a processor implements the processes of the foregoing object position adjustment method embodiment and a same technical effect can be achieved. To avoid repetition, details are not described herein again. The computer-readable storage medium includes a read-only memory (ROM), a random access memory (RAM), a magnetic disk, or an optical disc.

An embodiment of the present disclosure further provides an electronic device, including:
  a touchscreen, where the touchscreen includes a touch-sensitive surface and a display screen;
  one or more processors;
  one or more memories;
  one or more sensors; and
  one or more computer programs, where the one or more computer programs are stored in the one or more memories, the one or more computer programs include an instruction, and when the instruction is executed by the electronic device, the electronic device performs the steps of the foregoing object position adjustment method.

An embodiment of the present disclosure further provides a computer non-transitory storage medium. The computer non-transitory storage medium stores a computer program, and when the computer program is executed by a computing device, the steps of the foregoing object position adjustment method are implemented.

An embodiment of the present disclosure further provides a computer program product. When running on a computer, the computer program product enables the computer to perform the steps of the foregoing object position adjustment method.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing an electronic device (which may be a mobile phone, a computer, a server, an air conditioner, a network device, or the like) to perform the methods in the embodiments of the present disclosure.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

The invention claimed is:

1. An object position adjustment method, comprising:
receiving a first input performed by a user on a first interface of an electronic device;
marking a first object on the first interface by using a first mark in response to the first input, wherein the first mark is a first mark number;
receiving a second input performed by the user on a second interface of the electronic device; and
switching positions of the first object on the first interface and a second object on the second interface in response to the second input, wherein
the second object is marked by using a second mark, wherein the second mark is a second mark number;
wherein the switching the positions of the first object on the first interface and the second object on the second interface in response to the second input comprises:
obtaining a third input feature of the second input; and
marking the second object by using the second mark based on the third input feature, and switching the positions of the first object and the second object in a case that the second mark matches the first mark;
wherein the third input feature comprises: first input sequence and first fingerprint information, the first fingerprint information, or a first quantity of touch points;
or,
wherein the switching the positions of the first object on the first interface and the second object on the second interface in response to the second input comprises:
obtaining a fourth input feature of the second input;
marking the second object by using the second mark based on the fourth input feature;
receiving a fourth input performed by the user; and
switching the positions of the first object and the second object in response to the fourth input in a case that the first mark matches the second mark;
wherein the fourth input feature comprises: second input sequence and second fingerprint information, the second fingerprint information, or a second quantity of touch points.

2. The object position adjustment method according to claim 1, wherein there are N first objects, N is an integer greater than or equal to 1, the first input comprises N first sub-inputs, and each first sub-input acts on one first object; and
the marking the first object on the first interface by using the first mark in response to the first input comprises:
obtaining a first input feature of an $i^{th}$ first sub-input;
determining an $i^{th}$ first mark of an $i^{th}$ first object based on the first input feature; and
marking the $i^{th}$ first object by using the $i^{th}$ first mark, wherein
i is a positive integer, and i≤N.

3. The object position adjustment method according to claim 2, wherein the first input feature is a third input sequence and third fingerprint information that are of the $i^{th}$ first sub-input; and
the determining the $i^{th}$ first mark of the $i^{th}$ first object based on the first input feature comprises:
in a case that the third fingerprint information of the $i^{th}$ first sub-input is preset first fingerprint information, determining the $i^{th}$ first mark of the $i^{th}$ first object based on the third input sequence of the $i^{th}$ first sub-input.

4. The object position adjustment method according to claim 2, wherein the first input feature is third fingerprint information of the $i^{th}$ first sub-input, and the third fingerprint information of each first sub-input is different; and
the determining the $i^{th}$ first mark of the $i^{th}$ first object based on the first input feature comprises:
determining a mark associated with the third fingerprint information of the $i^{th}$ first sub-input as the $i^{th}$ first mark of the $i^{th}$ first object.

5. The object position adjustment method according to claim 2, wherein after the marking the first object on the first interface by using the first mark in response to the first input, the method further comprises:
receiving a third input performed by the user on a first target object and a second target object in the N first objects; and
exchanging the first mark of the first target object and the first mark of the second target object in the N first objects in response to the third input.

6. The object position adjustment method according to claim 5, wherein the receiving the third input performed by the user on the first target object and the second target object in the N first objects comprises:
receiving the third input through which the user moves the first target object to a position that at least partially overlaps the second target object.

7. The object position adjustment method according to claim 1, wherein there are M first objects, and M is an integer greater than or equal to 1; and the marking the first object on the first interface by using the first mark in response to the first input comprises:
obtaining a second input feature of the first input; and
marking the M first objects by using M first marks based on the second input feature.

8. The object position adjustment method according to claim 7, wherein the first input is a touch input performed by the user in a target area on a target interface, the target area does not comprise the first object or the second object, and the second input feature comprises M touch points; and
the marking the M first objects by using the M first marks based on the second input feature comprises:
sequentially marking the M first objects from a preset object on the target interface, wherein
the preset object comprises an object of a preset type or an object at a preset position; in a case that the preset object is the object of the preset type, the M first objects are objects of a same type; and in a case that the preset object is the object at the preset position, the M first objects are objects at adjacent arrangement positions or objects at preset arrangement intervals.

9. The object position adjustment method according to claim 1, wherein there are H second objects, H is an integer greater than or equal to 1, the second input comprises H second sub-inputs, and each second sub-input acts on one second object; and
the marking the second object by using the second mark based on the fourth input feature comprises:
obtaining a fourth input feature of a $j^{th}$ second sub-input;
determining a $j^{th}$ second mark of a $j^{th}$ second object based on the fourth input feature of the $j^{th}$ second sub-input; and
marking the $j^{th}$ second object by using the $j^{th}$ second mark, wherein
j is a positive integer, and j≤H.

10. The object position adjustment method according to claim 9, wherein the fourth input feature is the second input sequence and the second fingerprint information that are of the $j^{th}$ second sub-input; and
the determining the $j^{th}$ second mark of the $j^{th}$ second object based on the fourth input feature comprises:
in a case that the second fingerprint information of the $j^{th}$ second sub-input is preset second fingerprint information, determining the $j^{th}$ second mark of the $j^{th}$ second object based on the second input sequence of the $j^{th}$ second sub-input.

11. The object position adjustment method according to claim 9, wherein the fourth input feature is the second fingerprint information of the $j^{th}$ second sub-input, and the second fingerprint information of each second sub-input is different; and
the determining the $j^{th}$ second mark of the $j^{th}$ second object based on the fourth input feature comprises:
determining a mark associated with the second fingerprint information of the $j^{th}$ second sub-input as the $j^{th}$ second mark of the $j^{th}$ second object.

12. The object position adjustment method according to claim 1, wherein there are K second objects, and K is an integer greater than or equal to 1; and
the marking the second object by using the second mark based on the fourth input feature comprises:
marking the K second objects by using K second marks based on the fourth input feature.

13. The object position adjustment method according to claim 12, wherein the second input is a touch input performed by the user in a target area on a target interface, the target area does not comprise the first object or the second object, and the fourth input feature comprises K touch points; and
the marking the K second objects by using the K second marks based on the fourth input feature comprises:
sequentially marking the K second objects from a preset object on the target interface, wherein
the preset object comprises an object of a preset type or an object at a preset position; in a case that the preset object is the object of the preset type, the K second objects are objects of a same type; and in a case that the preset object is the object at the preset position, the K second objects are objects at adjacent arrangement positions or objects at preset arrangement intervals.

14. The object position adjustment method according to claim 1, wherein the first object is an object on the first interface, and the second object is an object on the second interface; and
before the switching the positions of the first object on the first interface and the second object on the second interface in response to the second input, the method further comprises:
receiving a fifth input performed by the user in a blank area on the second interface; and
displaying the marked first object in response to the fifth input.

15. The object position adjustment method according to claim 14, wherein the displaying the marked first object in response to the fifth input comprises:
obtaining a fifth input feature of the fifth input; and
displaying the marked first object in a case that the fifth input feature is the same as an input feature of the first input.

16. The object position adjustment method according to claim 14, wherein the displaying the marked first object in response to the fifth input comprises:
obtaining fourth fingerprint information of the fifth input and an input manner of the fifth input; and
displaying the marked first object in a case that the fourth fingerprint information of the fifth input is preset second fingerprint information and the input manner of the fifth input is a preset input manner.

17. An electronic device, comprising: a memory, a processor, and a program stored in the memory and executable on the processor, wherein the program, when executed by the processor, causes the electronic device to perform:
receiving a first input performed by a user on a first interface of the electronic device;
marking a first object on the first interface by using a first mark in response to the first input, wherein the first mark is a first mark number;
receiving a second input performed by the user on a second interface of the electronic device; and
switching positions of the first object on the first interface and a second object on the second interface in response to the second input, wherein
the second object is marked by using a second mark, wherein the second mark is a second mark number;
wherein the switching the positions of the first object on the first interface and the second object on the second interface in response to the second input comprises:
obtaining a third input feature of the second input; and
marking the second object by using the second mark based on the third input feature, and switching the positions of the first object and the second object in a case that the second mark matches the first mark;

wherein the third input feature comprises: first input sequence and first fingerprint information, the first fingerprint information, or a first quantity of touch points;

or, wherein the switching the positions of the first object on the first interface and the second object on the second interface in response to the second input comprises:

obtaining a fourth input feature of the second input;

marking the second object by using the second mark based on the fourth input feature;

receiving a fourth input performed by the user; and switching the positions of the first object and the second object in response to the fourth input in a case that the first mark matches the second mark;

wherein the fourth input feature comprises: second input sequence and second fingerprint information, the second fingerprint information, or a second quantity of touch points.

18. The electronic device according to claim 17, wherein there are N first objects, N is an integer greater than or equal to 1, the first input comprises N first sub-inputs, and each first sub-input acts on one first object; and the program, when executed by the processor, causes the electronic device to further perform:

obtaining a first input feature of an $i^{th}$ first sub-input;

determining an $i^{th}$ first mark of an $i^{th}$ first object based on the first input feature; and marking the $i^{th}$ first object by using the $i^{th}$ first mark, wherein i is a positive integer, and i≤N.

* * * * *